US012793788B2

(12) United States Patent
Lu

(10) Patent No.: US 12,793,788 B2
(45) **Date of Patent: *Nov. 10, 2026**

(54) METHOD AND APPARATUS FOR PUF GENERATOR CHARACTERIZATION

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 125 days.

This patent is subject to a terminal disclaimer.

(21) Appl. No.: 18/767,843

(22) Filed: Jul. 9, 2024

(65) Prior Publication Data

US 2024/0363171 A1 Oct. 31, 2024

Related U.S. Application Data

(63) Continuation of application No. 17/960,018, filed on Oct. 4, 2022, now Pat. No. 12,068,038, which is a (Continued)

(51) Int. Cl.
*G11C 16/22* (2006.01)
*G06F 12/14* (2006.01)
*H04L 9/32* (2006.01)

(52) U.S. Cl.
CPC .......... *G11C 16/22* (2013.01); *G06F 12/1408* (2013.01); *H04L 9/3278* (2013.01)

(58) Field of Classification Search
CPC .......... G11C 16/22; G11C 29/50; G11C 7/24; G11C 11/412; G11C 2029/4402; (Continued)

(56) References Cited

U.S. PATENT DOCUMENTS 9,189,654 B2 11/2015 Feng et al.
9,262,256 B2 2/2016 Mathew et al.
(Continued)

*Primary Examiner* — Quazi Farooqui
(74) *Attorney, Agent, or Firm* — Merchant & Gould P.C.

(57) ABSTRACT

Disclosed is a physical unclonable function generator circuit and testing method. In one embodiment, a testing method for physical unclonable function (PUF) generator includes: verifying a functionality of a PUF generator by writing preconfigured logical states to and reading output logical states from a plurality of bit cells in a PUF cell array; determining a first number of first bit cells in the PUF cell array, wherein the output logical states of the first bit cells are different from the preconfigured logical states; when the first number of first bit cells is less than a first predetermined number, generating a first map under a first set of operation conditions using the PUF generator and a masking circuit, generating a second map under a second set of operation conditions using the PUF generator and the masking circuit, determining a second number of second bit cells, wherein the second bit cells are stable in the first map and unstable in the second map; when the second number of second bit cells is determined to be zero, determining a third number of third bit cells, wherein the third bit cells are stable in the first map and stable in the second map; and when the third number of third bit cells are greater than a second preconfigured number, the PUF generator is determined as a qualified PUF generator.

20 Claims, 11 Drawing Sheets

Related U.S. Application Data continuation of application No. 17/014,707, filed on Sep. 8, 2020, now Pat. No. 11,495,300, which is a continuation of application No. 16/004,199, filed on Jun. 8, 2018, now Pat. No. 10,770,146.

(58) Field of Classification Search
CPC ......... G11C 2029/5002; G06F 12/1408; H04L 9/3278; H04L 2209/04; H04L 2209/12; H04L 9/3247; G01R 31/2853
See application file for complete search history.

(56) References Cited

U.S. PATENT DOCUMENTS

| | | | |
|---|---|---|---|
| 9,584,329 | B1 * | 2/2017 | Trimberger ........... H04L 9/3278 |
| 9,870,829 | B2 | 1/2018 | Park et al. |
| 10,032,521 | B2 | 7/2018 | Grigoriev et al. |
| 10,153,035 | B2 | 12/2018 | Lin et al. |
| 10,460,780 | B2 | 10/2019 | Kim et al. |
| 11,005,669 | B2 * | 5/2021 | O'Connell ............ H04L 9/0866 |
| 2018/0069711 | A1 | 3/2018 | Lu et al. |
| 2018/0123808 | A1 | 5/2018 | Hung et al. |
| 2018/0176012 | A1 | 6/2018 | Hung et al. |
| 2018/0241557 | A1 | 8/2018 | Maes et al. |
| 2018/0278418 | A1 | 9/2018 | Chang et al. |
| 2018/0337777 | A1 | 11/2018 | Shieh et al. |
| 2019/0027433 | A1 | 1/2019 | Kaltalioglu et al. |
| 2019/0065734 | A1 | 2/2019 | Yao |
| 2019/0068383 | A1 | 2/2019 | Wang |
| 2019/0114097 | A1 | 4/2019 | Tran et al. |
| 2019/0116052 | A1 | 4/2019 | Kim et al. |
| 2019/0158299 | A1 | 5/2019 | Poo et al. |
| 2019/0165953 | A1 | 5/2019 | Shor et al. |
| 2019/0221139 | A1 | 7/2019 | Schrijen et al. |
| 2019/0229933 | A1 | 7/2019 | Li et al. |
| 2019/0252016 | A1 | 8/2019 | Rodriguez et al. |
| 2019/0253266 | A1 | 8/2019 | Lee et al. |
| 2019/0333567 | A1 | 10/2019 | Giterman et al. |
| 2019/0342106 | A1 | 11/2019 | Li et al. |
| 2020/0014547 | A1 | 1/2020 | Lu et al. |

* cited by examiner

METHOD AND APPARATUS FOR PUF GENERATOR CHARACTERIZATION

CROSS-REFERENCE TO RELATED APPLICATION

This application is a continuation of U.S. patent application Ser. No. 17/960,018, filed Oct. 4, 2022, which is a continuation application of U.S. patent application Ser. No. 17/014,707, filed Sep. 8, 2020, now U.S. Pat. No. 11,495,300, which is a continuation application of U.S. application Ser. No. 16/004,199, filed Jun. 8, 2018, now U.S. Pat. No. 10,770,146, the contents of each are incorporated by reference in their entireties.

BACKGROUND

A physically unclonable function (PUF) generator is a physical structure generally within an integrated circuit that provides a number of corresponding outputs (e.g., responses) in response to inputs (e.g., challenges/requests) to the PUF generator. A unique identity of the integrated circuit may be established by such challenge-response pairs provided by the PUF generator. With the establishment of the identity, secure communication can be guaranteed. The PUF generator can also be used for existing authentication purposes to replace the current method of assigning an identity to an electronic device. Since the PUF generator is based on intrinsic properties of a manufacturing process, the PUF has various advantages over conventional authentication approaches that inscribes an identity on a device which may be mimicked and/or reverse engineered more easily.

For quality-control purposes, testing of functionalities of PUF generators after manufacturing is required to determine qualified PUF generators and categorize qualified PUF generators according to their repeatability and uniqueness. There exists a need to develop a method to characterize PUF generators for quality-control purposes at high speed and at low cost in order to identify defective PUF generators, to categorize qualified PUF generators, and to provide insights of the manufacturing processes.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1:
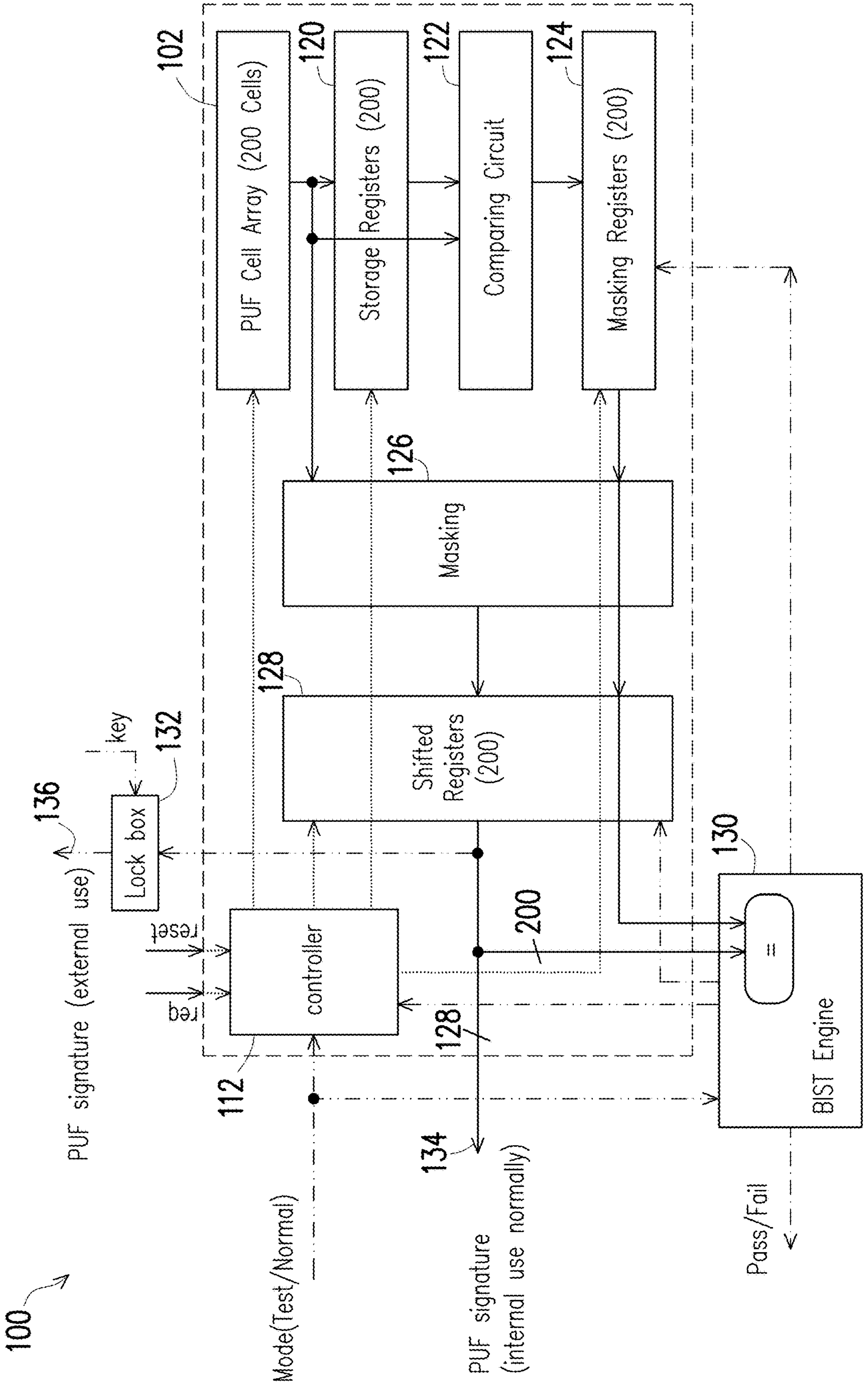
FIG. 1 illustrates an exemplary block diagram of a PUF generator, in accordance with some embodiments of present disclosure.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

It is understood that even though each of the bit cells in a PUF cell array and even each of the devices within the same bit cell are manufactured using the same process, one or more manufacturing variabilities may still cause each bit cell of the SRAM device to be unique and one of its uniqueness is intrinsically tend to be at a high state (i.e., a logic "1") or at a low state (i.e., a logic "0") while the bit cell is accessed. In other words, each bit cell may have an intrinsic tendency to present either a logic "1" or a logic "0", and moreover, some bit cells may have a strong intrinsic tendency and some bit cells may have a weak intrinsic tendency. Intrinsic tendencies of each bit cell can be different, which are caused by variations in parameters through a fundamentally non-uniform manufacturing process. This intrinsic tendency may be used to determine whether such a bit cell is suitable (i.e., strong tendency to generate a logical state either "1" or "0") to provide a reliable PUF signature. When a bit cell has a strong intrinsic tendency, the bit cell may remain at its "preferred" logical state for a longer time or transition to its "preferred" logical state very quickly and/or at a statistically higher frequency when the memory-based PUF generator is accessed. In some embodiments, such a bit cell may be referred to as a "stable bit cell". When a bit cell has a weak intrinsic tendency, the bit cell does not have a "preferred" logical state. That is, the bit cell with weak intrinsic tendency may sometimes present (e.g., remain at or transition to) a high state and sometimes present (e.g., remain at or transition to) a low state without statistic preference when the memory-based PUF generator is accessed. In some embodiments, such a bit cell may be referred to as an "unstable bit cell". An ideal PUF generator comprises no unstable bit cells. Further, a PUF generator should give a repeatable response every time it is challenged. That is, the Intra-Humming Distance (HD) of responses, which is used to describe the repeatability of a PUF generator, should be as close to 0 as possible. Intra-HD of 0 indicates the PUF generator is perfectly repeatable. At the same time, PUF generators and their responses should be as different as possible. Thus, the Inter-HD of responses, which is used to describe the uniqueness of a PUF generator, should be as close to 50% as possible. If Inter-HD of all responses are 50% then each PUF generator is unique. This disclosure presents various embodiments of a quality control testing method and apparatus for PUF generators.

FIG. 1 illustrates an exemplary block diagram of a PUF generator 100, in accordance with some embodiments of present disclosure. It is noted that the PUF generator 100 is merely an example, and is not intended to limit the present disclosure. Accordingly, it is understood that additional functional blocks may be provided in or coupled to the PUF generator 100 of FIG. 1, and that some other functional blocks may only be briefly described herein.

In the illustrated embodiment of FIG. 1, the PUF generator 100 comprises a PUF cell array 102, which comprises a plurality of bit cells in the PUF cell array 102. The plurality of bit cells are arranged in a column-row configuration in which each column has a bit line (BL) and a bit line bar (BLB), each row has a word line (WL) and a word line bar (WLB). More specifically, the BL and BLB of each column are respectively coupled to a plurality of bit cells that are disposed in that column, and each memory cell in that column is arranged on a different row and coupled to a respective (different) WL and a respective (different) WLB. That is, each bit cell of the PUF cell array 102 is coupled to a BL of a column of the PUF cell array 102, a BLB of the column of the PUF cell array 102, a WL of a row of the PUF cell array 102 and a WLB of a row of the PUF cell array 102. In some embodiments, the BL's and BLB's are arranged in parallel vertically and the WL's and WLB's are arranged in parallel horizontally (i.e., perpendicular to the BL's and BLB's). In some embodiments, WL and WLB for each row of bit cells in the PUF cell array 102 are connected together. In some embodiments, as discussed in further detail in FIGS. 2 and 4, the PUF cell array 102 can further includes a bit pre-charge line (BPC), a PUF output, and a PUF output bar for each row of bit cells. An illustrated embodiment of the PUF cell array 102 will be provided in further detail below with reference to FIG. 2.

In one illustrated embodiment, each of the bit cells of the PUF cell array 102 comprises a 14-transistors (14T) SRAM (Static Random Access Memory) bit cell, which will be described in further detail below in FIG. 3. In some other embodiments, the bit cells of the PUF cell array 102 may be implemented as any of a variety of types of memory cells such as, for example, 2T-2R SRAM bit cell, 4T-SRAM bit cell, 8T-SRAM bit cell, leakage-based DRAM (Dynamic Random Access Memory) bit cells, etc., according to some embodiments of present disclosure.

In the illustrated embodiment as shown in FIG. 1, the PUF generator 100 further comprises a storage register 120, a comparing circuit 122, a mask register 124, a masking circuit 126, and a shifted register 128. In some embodiments, the comparing circuit 122 is a XOR gate (exclusive gate), which only outputs a logic 0, when all the inputs are equal. As described above, in some embodiments, the controller 112 is coupled to the PUF cell array 102, storage registers 120, masking registers 124 and shifted registers 128, which are configured to control the coupled components. In the illustrated embodiments, the PUF cell array 102 is coupled to the storage registers 120, the comparing circuit 122, and the masking circuit 126 directly. In some embodiments, the comparing circuit is coupled to the masking registers 124, which is further coupled to the masking circuit 126 and the shifted registers 128. In some embodiments, the shifted registers 128 comprises a cascade of flip flops. In some embodiments, the shift registers 128 comprises at least the same number of cells as PUF cells. The shift registers 128 are used to select the PUF cells used to generate the PUF signature bits based on only strongly biased PUF cells for signature generation. In some embodiments, at the shift registers 128 select the bits that are not marked in the masking map (masking array). In some embodiments, the shift registers 128 performs the filtering by only shifting out the first n bits that are needed for a PUF signature. In some embodiments, it may filter the bits by looking at the last n strongly biased bits, wherein n is the number of bits needed for signature. In some embodiments, we can mark any numbers of bits due to aging, as long as there is enough PUF bits that can continue to function.

The controller 112 configured to receive a request/challenge (e.g., a request to power on the coupled PUF cell array 102, a request to access the PUF signature of the PUF cell array 102, etc.). In some embodiments, the controller 112 is also configured to receive a test/normal mode input (e.g., switch between different operational modes). In some embodiments, the controller 112 is configured to transmit a response based on the logical states of the bit cells of the PUF cell array 102 (e.g., a PUF output) to the masking 126 or the copy array 120 in response to the request. The controller 112 is configured to control (e.g., increase or decrease) a voltage level of a supply voltage applied at each of the bit cells, control (e.g., increase or decrease) a voltage level applied at each of the WL and the WLB. In some embodiments, the controller 112 may enable the voltage supply to at least one selected column and at least one selected row. Further, the controller 112 may switch between the evaluation mode and the normal operation mode. The controller 112 may also introduce noise. In some embodiments, the controller 112 may control a periodic reading of logical states of the bit cells. These are described in further detail below with respect to FIG. 4. In some alternative embodiments, the controller 112 may be implemented as a separate block, which is not embedded in the PUF cell array 102. In some embodiments, the controller 112 can be embedded in the PUF cell array 102. In some embodiments, the timing control circuit 114 provide control and synchronization on pulse signals during read and write processes.

The controller 112 further comprises a noise injector (not shown). In some embodiments, the noise injector is controlled by the controller 112 to introduce noise directly into the plurality of bit cells of the PUF cell array 102 to create "stressed" operation conditions. In some embodiments, such "stressed" operation conditions are used to expedite the identification of unstable bit cells which do not provide constant logical states in order to create a masking array.

In some embodiments, the controller 112 is a representative device and may comprise a processor, a memory, an input/output interface, a communications interface, and a system bus. The processor may comprise any processing circuitry operative to control the operations and performance of the controller 112 of the PUF generator 100. In various aspects, the processor may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor also may be implemented by a controller, a microcontroller, an application specific integrated circuit (ASIC), a field programmable gate array (FPGA), a programmable logic device (PLD), and so forth.

In various aspects, the processor may be arranged to run an operating system (OS) and various applications. Examples of an OS comprise, for example, operating systems generally known under the trade name of Apple OS, Microsoft Windows OS, Android OS, and any other proprietary or open source OS.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in the memory.

In some embodiments, the memory may comprise any machine-readable or computer-readable media capable of storing data, including both volatile/non-volatile memory and removable/non-removable memory. The memory may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the controller 406 of the system 400.

For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory may contain an instruction set, in the form of a file for executing a method of generating one or more timing libraries as described herein. The instruction set may be stored in any acceptable form of machine-readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor.

In some embodiments, the I/O interface may comprise any suitable mechanism or component to at least enable a user to provide input (i.e., test/request and or test/normal modes, etc.) to the controller 112 of the PUF generator 100 and the controller 112 to provide output control to the other components of the PUF generator 100 (e.g., PUF cell array 102, shifted registers 128, storage registers 120, etc.).

In some embodiments, the PUF generator 100 further comprises a BIST (Built-in Self Test) engine 130 and a lock box 132. The BIST engine 130 allows the PUF generator 100 to tests its functionality after manufacturing for quality control in a cost effective fashion and at a low complexity. In some embodiments, the BIST engine 130 is automated receiving testing instructions through the controller 112. In some embodiments, the BIST engine 130 is also coupled to the controller 112, shifted registers 128 and masking registers 124 to provide feedback based on the test results, for example number of critical bit cells and number of stable bit cells, etc., which are discussed in further detail in FIG. 7. In some embodiments, the PUF output can be transmitted through a first port 134 for internal uses. In certain embodiments, the PUF output can be encrypted by a public key in the lock box 132 and transmitted to a server through a second port 136 for external uses.

During testing, an initial PUF output from the plurality of bit cells of the PUF cell array 102 is generated, it is first stored in the storage registers 120. In some embodiments, the storage registers 120 can be implemented with any type of on-chip memory design, including on-chip SRAMs. In some embodiments, the storage register 120 comprises on-chip memory array that contains the same number of bits as the number of bit cells in the PUF cell array 102 of the PUF generator 100. For example, if the PUF cell array comprises 200 bit cells, the storage registers comprises 200 bits. During an evaluation process, a second PUF output from the bit cells of the PUF cell array 102 is generated either by injecting noise to create a "stressed" operation condition or by changing operational conditions (i.e., temperature and operational voltage) on the plurality of bit cells in the PUF cell array 102. The second PUF output is then compared to the initial PUF output in a compare circuit 122 (i.e., a XOR gate). Unstable bit cells with different logical states in the two PUF outputs during the evaluation process are then identified and their addresses are stored in masking registers 124. This evaluation process repeats to acquire multiple PUF outputs during multiple iterations under the same or different stressed operation conditions (e.g., noises, temperature, voltage, etc.). The masking map comprising a map of stable and unstable bit cells identified by introducing noises to the plurality of bit cells in the PUF cell array 102 and the golden map comprising a map of stable and unstable bit cells identified by changing operation conditions to the plurality of bit cells in the PUF cell array 102 can be obtained and compared in the BIST engine 130. Faulty PUF generators are then discarded and PUF generators that pass the test is then used to generate a PUF signature.

During a normal operation to generate a PUF signature using a device that passes the afore-described test, the controller 112 switches from the testing mode to the normal operation mode. In some embodiments, the masking registers 124 are then directly coupled to the masking 126 and the shifted registers 128, which selects stable bit cells that are not marked by the masking registers 124 from a PUF output directly from the PUF cell array 102 and their logical states as the PUF signature. In some embodiments, the PUF signature can be transmitted through the first port 134 for internal uses or through the second port 136 after encrypted in the lock box 132 for external uses. In some embodiments, the PUF signature comprises an N-bit response and the initial PUF signature comprises an M-bit response, wherein $N \leq M$, N and M are positive integers. For example, referring to FIG. 1 again, there are 200 bit cells in the PUF cell array and 128 bit cells identified during testing are stable and used as the PUF signature.

Figure 2:
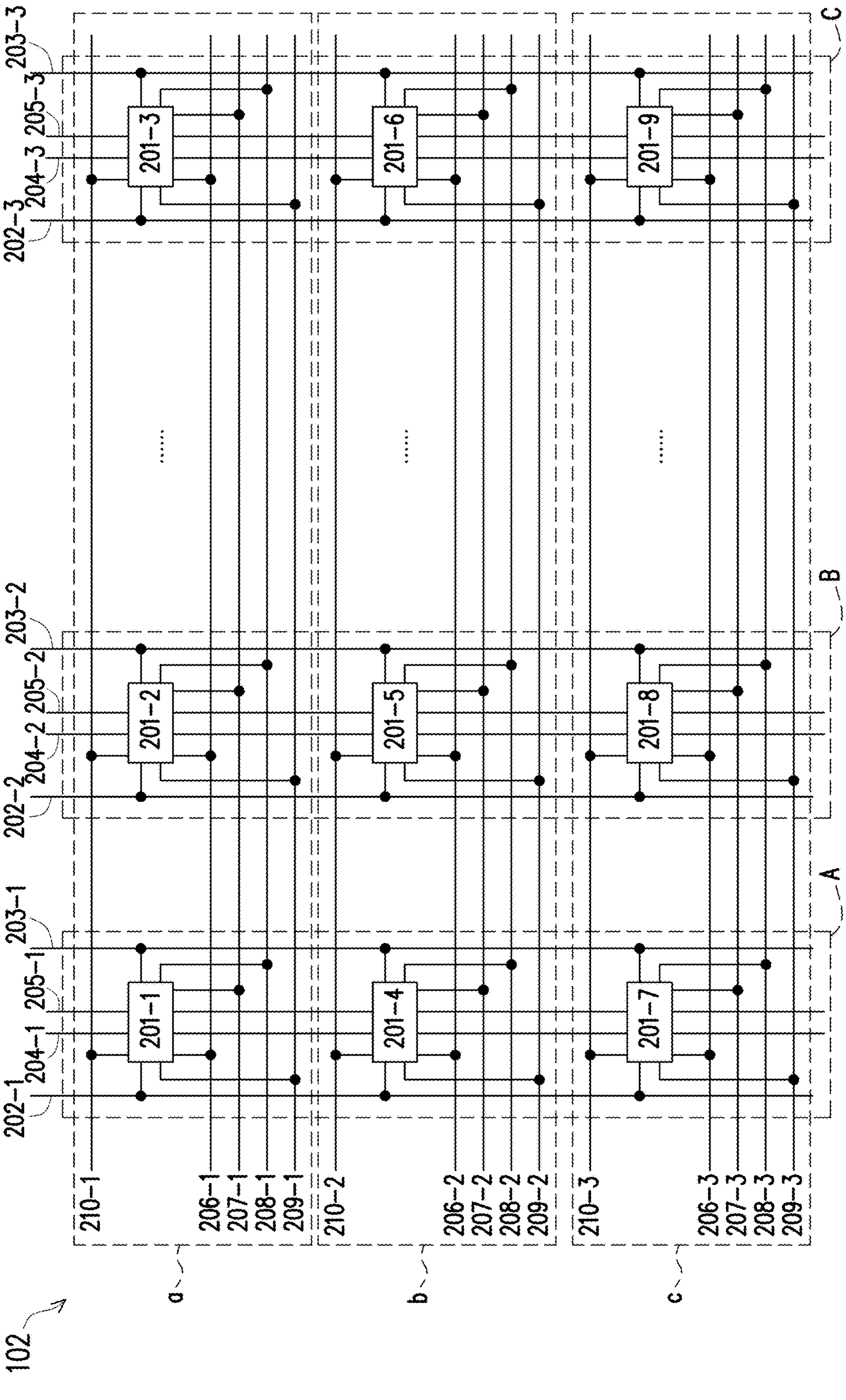
FIG. 2 illustrates an exemplary circuit diagram of a PUF cell array comprising a plurality of bit cells, in accordance with some embodiments of present disclosure.

FIG. 2 illustrates an exemplary circuit diagram of a PUF cell array 102 comprising a plurality of bit cells, in accordance with some embodiments of present disclosure. In some embodiments, the PUF cell array 102 includes a plurality of bit cells 201-1, 201-2, 201-3, 201-4, 201-5, 201-6, 201-7, 201-8, and up to 201-9. Although only 9 bit cells are shown, any desired number of bit cells may be included in the PUF cell array 102 while remaining within the scope of the present disclosure. As described above, the bit cells 201-1, 201-2, 201-3, 201-4, 201-5, 201-6, 201-7, 201-8, and 201-9 are arranged in a column-row configuration. More specifically, in some embodiments, the PUF cell array 102 includes bit lines (BL's) 202-1, 202-2, and 202-3 arranged in parallel, bit line bars (BLB's) 203-1, 203-2, and 203-3 also arranged in parallel, word lines (WL's) 206-1, 206-2, and 206-3, and word line bars (WLB's) 207-1, 207-2 and 207-3. The WL's and WLB's are arranged in parallel orthogonally to the BL's and BLB's. In some embodiments, WL's 206 is coupled to the corresponding WLB's 207. In some embodiments, the PUF cell array 102 also includes positive supply voltage power (bit voltage) 204-1, 204-2, and 204-3, and reference/ground voltage (zero voltage) 205-1, 205-2 and 205-3. As such, the PUF cell array 102 may include a first plurality of columns (e.g., arranged vertically), a second plurality of rows (e.g., arranged horizontally), wherein each column includes a respective pair of BL 202, BLB 203, power supply voltage 204, reference/ground voltage 205, and each row includes a respective WL 206 and a respective WLB 207. In the illustrated embodiments, the PUF cell array 102 may also include PUF output 208-1, 208-2, and 208-3, and PUF output bar 209-1, 209-2, and 209-3, which are directly coupled to storage nodes in the bit cell through a respective inverter. Further, the PUF cell array 102 may also include bit pre-charge line (BPC) 210-1, 210-2 and 210-3, which is used to enable or disable the power supply voltage 204 to cross-coupled inverters of the bit cell, which are discussed in detail in FIG. 4.

For example, as shown in the illustrated embodiment of FIG. 2A, the PUF cell array 102 includes columns "A," "B," and "C," and rows "a," "b," and "c," wherein column A includes respective BL 202-1, BLB 203-1, power supply voltage 204-1 and reference/ground voltage 205-1; column B includes respective BL 202-2, BLB 203-2, power supply voltage 204-2 and reference/ground voltage 205-2; column C includes respective BL 202-3, BLB 203-3, power supply voltage 204-3 and reference/ground voltage 205-3; row a includes a respective WL 206-1, WLB 207-1, BPC 210-1, PUF output 208-1, PUF output bar 209-1; row b includes a respective WL 206-2, WLB 207-2, BPC 210-2, PUF output 208-2, PUF output bar 209-2; and row c includes a respective WL 206-3, WLB 207-3, BPC 210-3, PUF output 208-3, PUF output bar 209-3.

Moreover, each column includes one or more bit cells that are each coupled to the column's respective BL and BLB, a different separate WL, WLB, BPC, PUF output, and PUF output bar. For example, column A includes bit cells 200-1, 200-4, and 200-7, wherein the bit cells 200-1, 200-4, and 200-7 are each coupled to the BL 202-1, BLB 203-1, power supply voltage 204-1, reference/ground voltage 205-1, WL's 206-1, 206-2, and 206-3, WLB's 207-1, 207-2, and 207-3, BPC's 210-1, 210-2, and 210-3, PUF output 208-1, 208-2, and 208-3; and PUF output bar 209-1, 209-2, and 209-3, respectively; column B includes bit cells 200-2, 200-5, and 200-8, wherein the bit cells 200-2, 200-5, and 200-8 are each coupled to the BL 202-2, BLB 203-2, power supply voltage 204-2, reference/ground voltage 205-2, WL's 206-1, 206-2, and 206-3, WLB's 207-1, 207-2, and 207-3, BPC's 210-1, 210-2, and 210-3, PUF output 208-1, 208-2, and 208-3; and PUF output bar 209-1, 209-2, and 209-3, respectively; and column C includes bit cells 200-3, 200-6, and 200-9, wherein the bit cells 200-3, 200-6, and 200-9 are each coupled to the BL 202-3, BLB 203-3, power supply voltage 204-3, reference/ground voltage 205-3, WL's 206-1, 206-2, and 206-3, WLB's 207-1, 207-2, and 207-3, BPC's 210-1, 210-2, and 210-3, PUF output 208-1, 208-2, and 208-3; and PUF output bar 209-1, 209-2, and 209-3, respectively.

As described above, each bit cell of the PUF cell array 102 (e.g., 201-1, 200-2, 201-3, 201-4, 200-5, 201-6, 200-7, 201-8, 201-9, etc.) may include a plurality of transistors (e.g., six MOSFET's for a 6T-SRAM bit cell, eight MOSFET's for an 8T-SRAM bit, three MOSFET's for a 3T-DRAM bit, twelve MOSFET's for a 12T-SRAM bit, three MOSFET's for a 3-T DRAM bit, etc.). In some embodiments, a logical state stored in each bit cell may be written to the bit cell by applying either a high state (i.e., a logical "1") or a low state (i.e., a logical "0") through a corresponding BL, BLB, WL, and WLB. In some embodiments, a stable logical state of a bit cell can be achieved after stabilizing from a metastable logical state due to intrinsic differences in the bit cell (e.g., intrinsic strength differences between back-to-back coupled inverters in SRAM based bit cells, or intrinsic differences in current leakage rates in DRAM based bit cells, etc.). It should be also noted that FIG. 2 is only an example for illustration purposes and is not intended to be limiting. The type of signal lines in a PUF cell array 102 in in this present disclosure can be arranged in different ways depending on the circuit layout design and types of bit cells used in the array. For example, the PUF output 208 and PUF output bar 209 can be arranged in parallel to the BL 202 and BLB 203. For another example, the WLB 207, BPC 210, or PUF output bar 209 may not be necessary in a PUF cell array 102 that comprises a plurality of 2-T DRAM bit cells.

Figure 3:
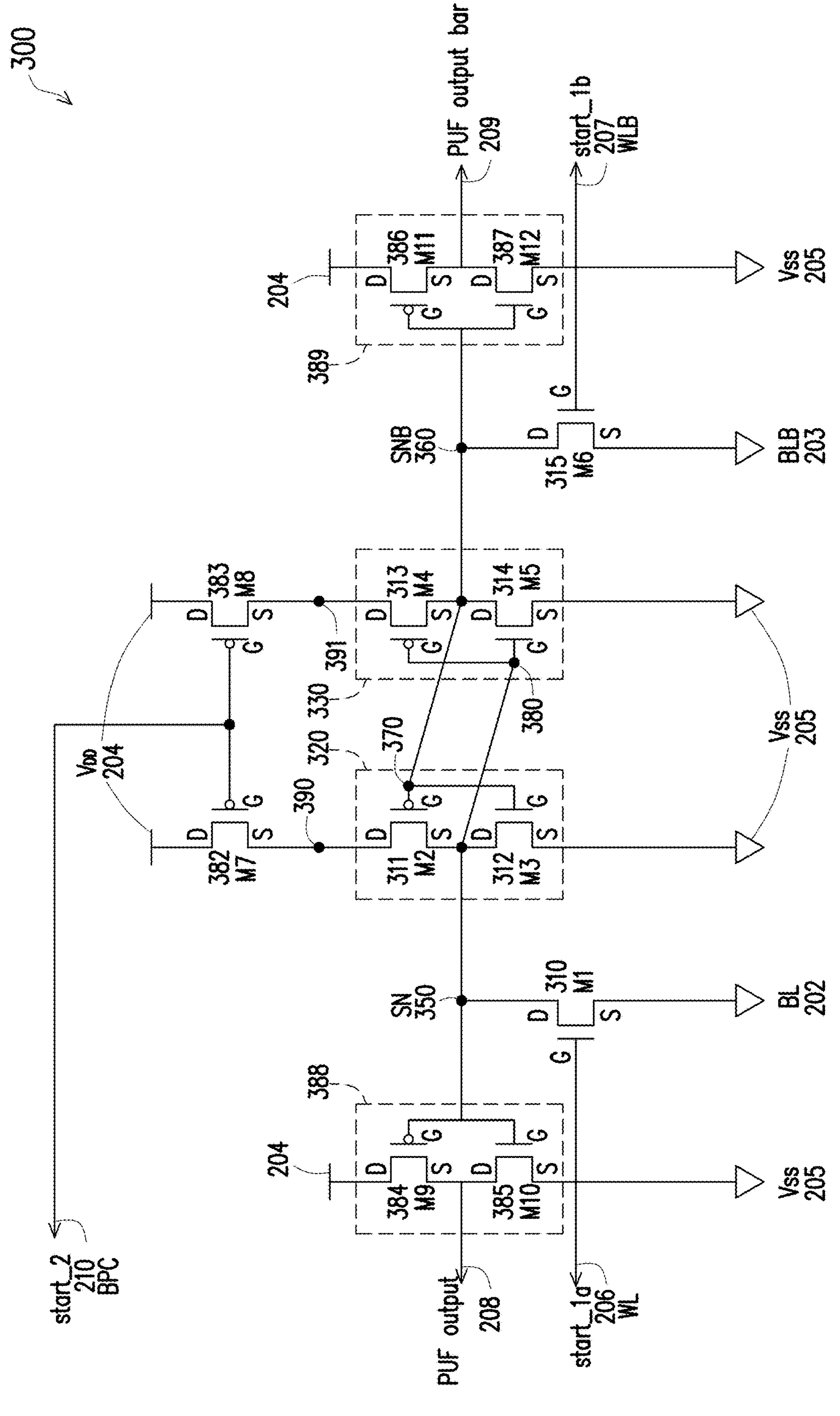
FIG. 3 illustrates an exemplary circuit diagram of a bit cell that is implemented as a 12-T SRAM bit cell, in accordance with some embodiments of the present disclosure.

FIG. 3 illustrates an exemplary circuit diagram of a bit cell 300 that is implemented as a 12-T SRAM bit cell, in accordance with some embodiments of the present disclosure. The bit cell 300 includes 12 transistors: M1 310, M2 311, M3 312, M4 313, M5 314, M6 315, M7 382, M8 383, M9 384, M10 385, M11 386, and M12 387. In some embodiments, the transistors M7 382 and M8 383 are enable transistors; the transistors M1 310 and M6 315 are access transistors.

In some embodiments, the transistors M2 311 and M3 312 are formed as a first inverter 320 on the left and the transistors M4 313 and M5 314 are formed as a second inverter 330 on the right wherein the first and second inverters 320/330 are cross-coupled to each other. More specifically, source terminal of the transistor M2 311 is coupled with drain terminal of the transistor M3 312 at a storage node (SN) 350. Similarly, source terminal of the transistor M4 313 is coupled with drain terminal of the transistor M5 314 at a storage node bar (SNB) 360. Gate terminals of the transistors M2 311 and M3 312 are coupled together at node 370, while gate terminals of the transistors M4 313 and M5 314 are coupled together at node 380. Drain terminals of transistors M2 311 and M4 313 are coupled to source terminals of enable transistors M7 382 and M8 383 at nodes 390 and 391, respectively. In some embodiments, the nodes 390/391 are coupled together. In some embodiments, there is only one enable transistor between the coupled nodes 390/391 and the power supply voltage 204. Drain terminals of enable transistors M7 382 and M8 383 are coupled to a power supply voltage 204. Source terminals of transistors M3 312 and M5 314 are coupled to reference/ground voltage 205. Gate terminals of the transistors M7 382 and M8 383 are coupled together and further electrically connected to a bit pre-charge line (BPC) 210.

Further, node 370 of the first inverter 320 is coupled to SNB 360 and node 380 of the second inverter 330 is coupled to SN 350. The transistors M1 310 and M6 315 are typically referred to as access transistors of the bit cell 300. The first inverter 320 is coupled to drain terminal of the transistor M1 310 at SN 350, and the second inverter 330 is coupled to drain terminal of the transistor M6 315 at SNB 360. In addition to being coupled to the cross-coupled inverters 320/330, the transistors M1 310 and M6 315 are both coupled to the BL 202/WL 206 and BLB 203/WLB 207, respectively. Specifically, gate terminals of the access transistors M1 310 and M6 315 are coupled to WL 206 and WLB 207, respectively; and source terminals of the access transistors M1 310 and M6 315 are coupled to BL 202 and BLB 203, respectively. In the illustrated embodiment, BL 202 and BLB 203 are coupled together to ground. In some embodiments, WL 206 and WLB 207 may be coupled together.

Further, SN 350 and SNB 360 are coupled to the PUF output 208 and PUF output bar 209 through a third invertor 388 and a fourth inverter 389, respectively. Specifically, the third inverter 388 and the fourth inverter 389 each comprises two transistors, i.e., M9 384 and M10 385 for the third inverter 388, and M11 386 and M12 387 for the fourth inverter 389. Gate terminals of transistors M9 384 and M10 385 are coupled together to SN 350 and gate terminals of transistors M11 386 and M12 387 are coupled together to SNB 360. Source terminals of transistors M9 384 and M11 386 are coupled to drain terminals of transistors M10 385 and M12 387 and further to the PUF output 208 and the PUF output bar 209, respectively. Drain terminals of transistors M9 384 and M11 386 are coupled to the power supply voltage 204. Source terminals of transistors M10 385 and M12 387 are coupled to the reference/ground voltage 205.

In some embodiments, the transistors M1 310, M3 312, M5 314, M6 315, M10 385, and M12 387 each includes an NMOS transistor, and the transistors M2 311, M4 313, M7 382, M8 383, M9 384, and M11 386 each includes a PMOS transistor. Although the illustrated embodiments of FIG. 3 shows that M1-M12 are either NMOS or PMOS transistors, any of a variety of transistors or devices that are suitable for use in a memory device may be implemented as at least one of M1-M12 such as, for example, a bipolar junction transistor (BJT), a high-electron mobility transistor (HEMT), etc.

Figure 4:
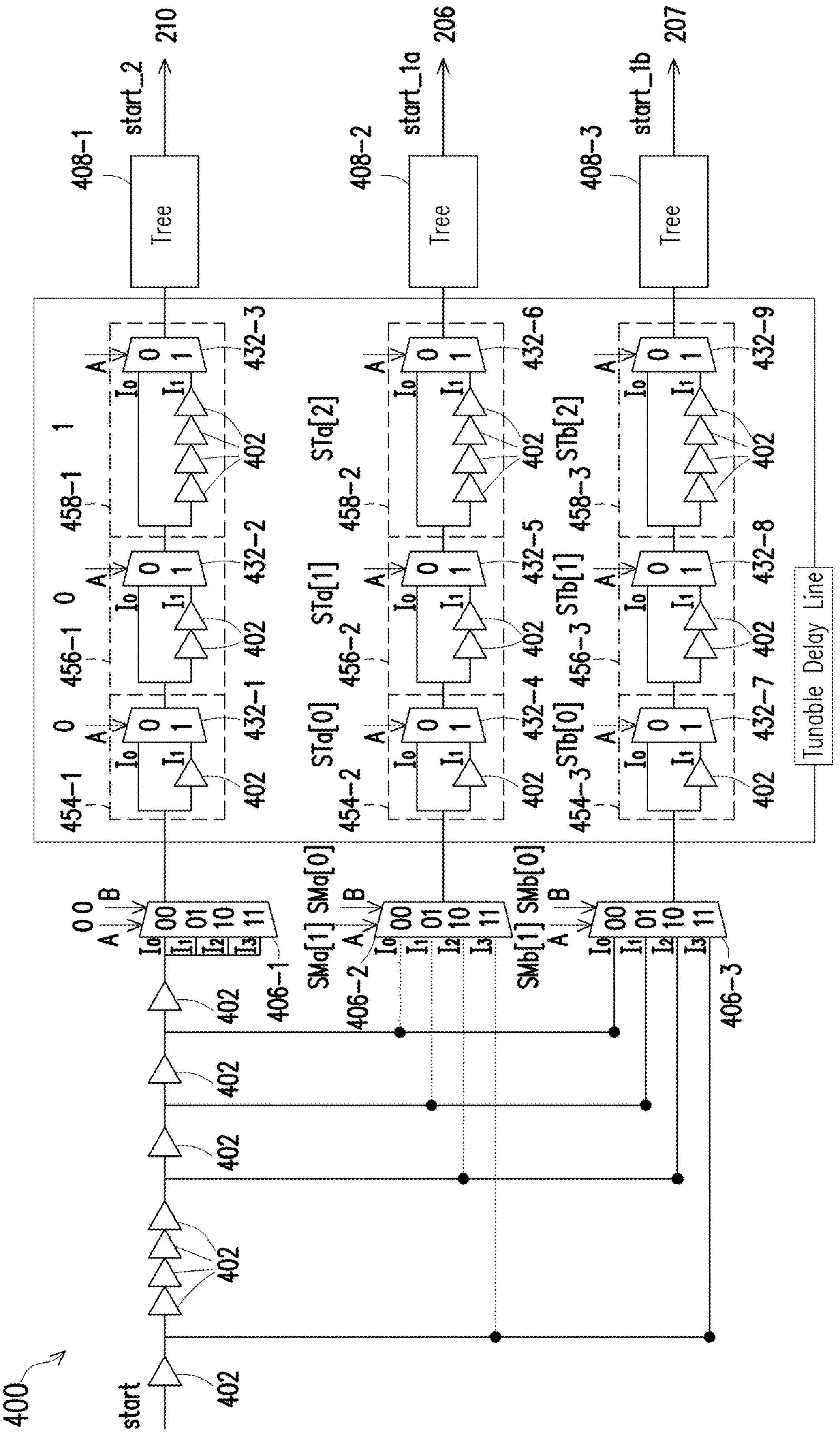
FIG. 4 illustrates an exemplary delay circuit to inject noise to internal nodes of bit cells, in accordance with some embodiments of the present disclosure.

FIG. 4 illustrates an exemplary delay circuit 400 to inject noise to internal nodes of bit cells 300, in accordance with some embodiments of the present disclosure. In the illustrated embodiments, the delay circuit 400 comprises 6 delay elements 402, 3 4-channel multiplexers (MUX) 406 (e.g., 406-1, 406-2, and 406-3), and 3 inverter trees 408 (e.g., 408-1, 408-2, and 408-3). Outputs of the 3 4-channel MUXs 406 (i.e., 406-1, 406-2 and 406-3) are each coupled to 3 tunable delay stages 454, 456 and 458, which are connected in series to further control the time delay of signals applied on each of the outputs (i.e., BPC 210, WL 206 and WLB 207). Specifically, a first 4-channel MUX 406-1 is coupled to a first tunable delay stage 454-1, a second tunable delay stage 456-1, and a third tunable delay stage 458-1; a second 4-channel MUX 406-2 is coupled to a fourth tunable delay stage 454-2, a fifth tunable delay stage 456-2, and a sixth tunable delay stage 458-2; and a third 4-channel MUX 406-3 is coupled to a seventh tunable delay stage 454-3, an eighth tunable delay stage 456-3, and a ninth tunable delay stage 458-3, in accordance with the illustrated embodiment.

In the illustrated embodiments, the 9 tunable delay stages 454-1, 456-1, 458-1, 454-2, 456-2, 458-2, 454-3, 456-3, and 458-3 each comprises a 2-channel MUX 432 (i.e., 432-1, 432-2, 432-3, 432-4, 432-5, 432-6, 432-7, 432-8, and 432-9). The 9 2-channel MUXs 432 each comprises 2 inputs, I0 and I1 and 1 data select line A, in the illustrated embodiment. In some embodiments, 2 inputs, I0 and I1 correspond to 2 logical values on the data select line 0 and 1, respectively. In some embodiments, inputs I0 of the 9 2-channel MUXs 432 are each coupled to zero delay element 402 and inputs I1 of the 9 2-channel MUXs 432 are each coupled to at least one delay element 402. Specifically, inputs I1 of the 2-channel MUXs 432-1, 432-4, and 432-7 are each coupled to 1 delay element 402; inputs I1 of the 2-channel MUXs 432-2, 432-5 and 432-8 are each coupled to 2 delay elements 402; and inputs I1 of the 2-channel MUXs 432-3, 432-6 and 432-9 are each coupled to 4 delay elements 402, in accordance with the illustrated embodiment. Further, inputs of the tunable delay stages 454-1, 454-2, and 454-3 are each coupled to the output of 4-channel MUXs 406-1, 406-2 and 406-3, respectively; the inputs of the tunable delay stages 456-1, 456-2 and 456-3 are each coupled to the outputs of the 2-channel MUXs 432-1, 432-4 and 432-7, respectively; and the inputs of the tunable delay stages 458-1, 458-2, and 458-3 are each coupled to the outputs of the 2-channel MUXs 432-2, 432-5 and 432-8, respectively; and the outputs of the 2-channel MUXs 432-3, 432-6 and 432-9 are each coupled to an inverter tree 408-1, 408-2 and 408-3, respectively, in accordance with the illustrated embodiment. In the illustrated embodiment, data select lines A of the 2-channel MUXs 432-1, 432-2, 432-3, 432-4, 432-5, 432-6, 432-7, 432-8, and 432-9 are each coupled to 0, 0, 1, STa0, STa1, STa2, STb0, STb1, and STb2, respectively.

In the illustrated embodiments, the 3 4-channel MUX 406 each comprises 4 inputs, I0, I1, I2, I3 and 2 data select lines A and B, in the illustrated embodiment. In some embodiments, 4 inputs, I0, I1, I2 and I3 correspond to 4 logical values on the data select lines 00, 01, 10 and 11, respectively. In some embodiments, inputs I0 of the 4-channel MUXs 406-2 and 406-3 are each coupled to 6 delay elements 402; inputs I1 of the 4-channel MUXs 406-2 and 406-3 are each coupled to 5 delay elements 402; inputs I2 of the 4-channel MUXs 406-2 and 406-3 are each coupled to 4 delay element 402, and inputs I3 of the 4-channel MUXs 406-2 and 406-3 are each coupled to no delay element. In the illustrated embodiments, the 4-channel MUXs 406-2 and 406-3 share the same delay elements 402. The 4-channel MUX 406-2 and 406-3, and their coupled delay elements are further coupled to a "start" input through a delay element 402. Further in the illustrated embodiment, all 4 inputs of the 4-channel MUX 406-1 are coupled to the input "start" through 8 delay elements 402. In some other embodiments, all 4 inputs of the 4-channel MUX 406-1 are grounded. Further, outputs from the inverter trees 408-1, 408-2, and 408-3 are coupled to the BPC 210, WL 206, and WLB 207, respectively. In some embodiments, the select lines A of the 9 2-channel MUXs and select lines AB of the 3 4-channel MUXs are coupled to the controller 112 which controls the relative timing between signals on the BPC 210, WL 206 and WLB 207.

FIG. 4 illustrate an exemplary delay circuit to inject noise to internal nodes 350/360 of bit cells 300, in accordance with some embodiments of the present disclosure. This is, of course, merely an example and is not intended to be limiting. Any types of delay circuit that can control the relative timing on signal lines of the bit cell with back-to-back coupled inverters to introduce noises to the internal nodes are within the scope of this invention. For example, inputs of the 2-channel MUXs 432 and 4-channel MUXs 406 may couple with different numbers of delay elements 402. For another example, the MUXs may comprise a different number of inputs and select lines to provide a desired time delay to each of the lines including WL 206, WLB 207 and BPC 210. It should be also noted that the delay circuit 400 is an exemplary method to introduce noises into bit cells such as bit cells 300 presented in FIG. 3 and is not intended to be limiting. Device and method to introduce noises depend on the technology of the bit cell used in the PUF cell array 102 and are within the scope of this invention. For example, noises can be introduced in the power supply voltage 204 and reference/ground voltage 205 using a ring oscillator.

Figure 5:
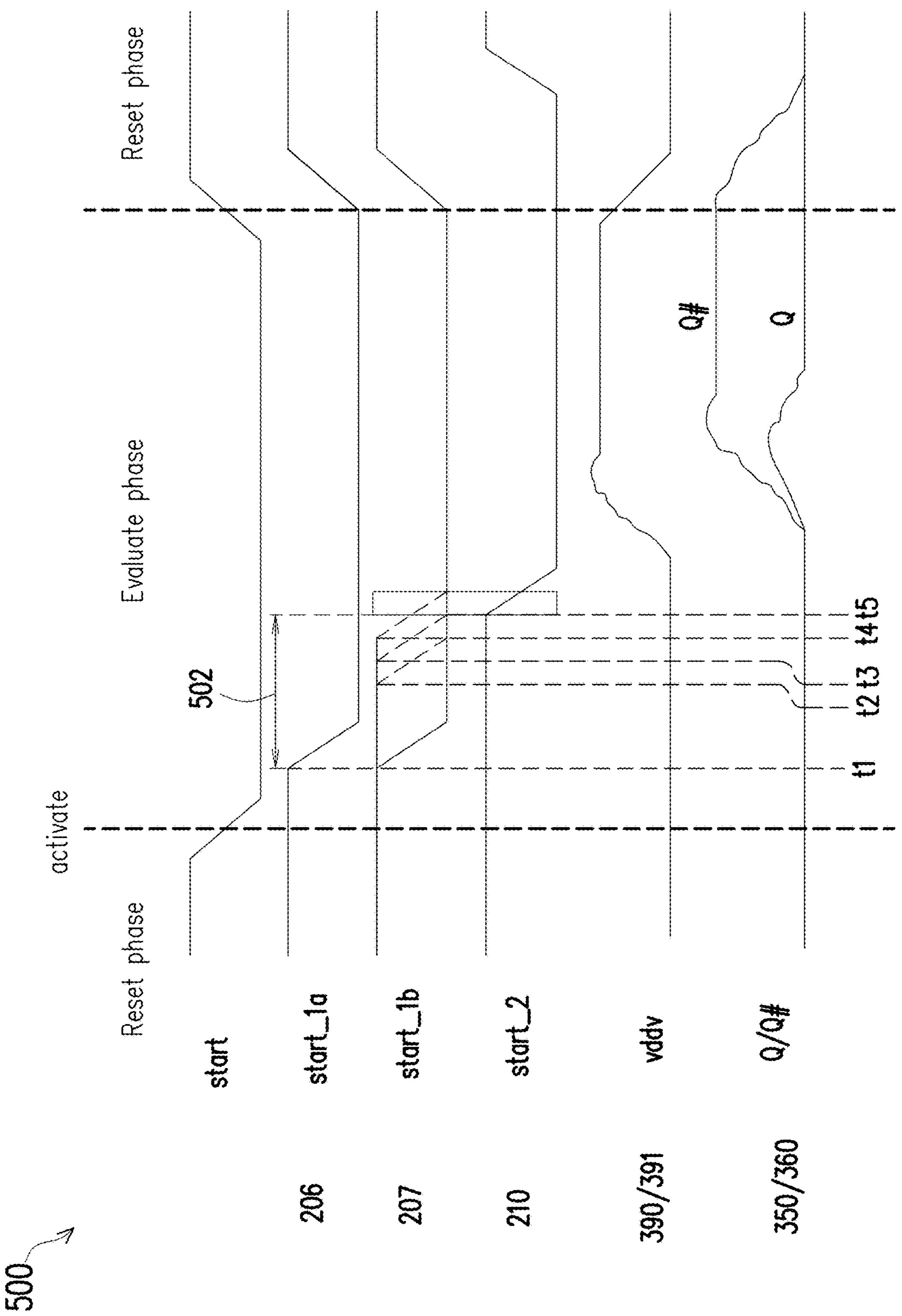
FIG. 5 illustrates waveforms of signals provided by a delay circuit to a bit cell of a PUF cell array, in accordance with some embodiments of the present disclosure.

FIG. 5 illustrates waveforms 500 of signals provided by a delay circuit 400 to a bit cell 300 of a PUF cell array 102, in accordance with some embodiments of the present disclosure. During a reset phase, the WL (start_1*a*) 206/WLB (start_1*b*) 207 are both pulled up, the access transistors M1 310 and M6 315 are turned on, which allow a discharge of the SN 350 and SNB 360 to GND, pre-charging the bit cell with metastable logical states on the SN 350 and SNB 360. When the SN 350 and SNB 360 are pulled down to GND by turning on the access transistors M1 310 and M6 315, the two cross-coupled inverters 320/330 without a power supply allow "0"s stored on the SN 350 and SNB 360. During a normal operation phase to generate a PUF output, the WL (start_1*a*) 206/WLB (start_1*b*) 207 are both pulled down at the same time at t1 which turns off the access transistors M1 310 and M6 315, and the BPC (start_2) 210 is then pulled down at t5, which is separated from the end of the pulling-down of the WL (start_1*a*) 206/WLB (start_1*b*) 207 by a time gap 502 (i.e., t5–t1). Pulling down the voltage level on the BPC (start_2) 210 turns on the enable transistors M7 382 and M8 383 and results in an increasing of voltage levels on the nodes 390 and 391, which then enable the cross-coupled inverters 320/330. Pulling down the WL (start_1*a*) 206/WLB (start_1*b*) 207 at the same time t1 is configured by setting up the select lines (i.e., SMa1/SMa0 and SMb1/SMb0) on the second and third 4-channel MUXs 406-2 and 406-3 at the same value through the controller 112. In some embodiments, the SMa1=SMa0=SMb1=SMb0=1, so that the pulling down applied on the BPC (start_2) 210 has the longest delay relative to the pulling down applied on the WL (start_1*a*) 206/WLB (start_1*b*) 207, giving the same tunable delay configuration for each lines. The metastable logical states cannot be sustained once the cross-coupled inverters 320/330 are enabled due to its particular back-to-back configuration of the two inverters and the strength difference between the two cross-coupled inverters 320 and 330 caused by intrinsic process variations during fabrication. The small mismatch of strength in the cross-coupled inverters 320/330 will be eventually amplified by the positive feedback of the cross-coupled inverters 320/330 and will eventually generate either logic "1" or logic "0". Since the design is highly symmetric and the only randomness is caused by the fabrication process of the transistors in the cross-coupled inverters, the binary output of the logical states, when the plurality of bit cells 300 are stabilized after being enabled by the enable transistors, are unique, random and non-traceable. Finally, the logical states on SN 350 and SNB 360 are further inverted by the respective inverters 388 and 389 before read out on to the PUF output 208 and PUF output bar 209, respectively.

Various types of noise can be injected during an evaluation process in order to identify unstable bit cells to generate a mask array. During an evaluation phase, the time gap 502 can be reduced and an overlap between the pulling down signal on WL 206 or WLB 20 and the pulling down signal on the BPC 210 can be introduced. Further, discharge pathways are added to SN 350 and SNB 360, when the cross-coupled inverters 320/330 are partially enabled by the enable transistors M7 382 and M8 383 and when the access transistors are not completely turned off, this results in different intermediate voltage levels on SN 350/SNB 360. Therefore, the discharge pathways due to the overlap of the pulling-down of the WL 206/207 and the pulling-down of the BPC 210 provide additional randomness, i.e., asymmetric intermediate voltage values between ground and $V_{DD}$ on the storage nodes. In some embodiments, the WL 206 and WLB 207 can be separately controlled by the delay circuit 400 illustrated in FIG. 4. In some embodiments, the pulling down on WL 207 is configured by applying values on select lines (SMb1 and SMb0) of the third 4-channel MUX 406-3 that are different from the values on the select lines (SMa1 and SMa0) of the second 4-channel MUX 406-2. In the illustrated embodiments, the WLB 207 is pulled down at t2, t3, and t4 when SMb1/SMb0 are set at 10, 01 and 00 and SMa1/SMa0 are set to 11, respectively. In the illustrated embodiment, when the WLB 207 is pulled down at t4, the pulling down signal on the WLB 207 starts to overlap with the pulling down signal on the BPC 210. To further increase the overlap, one can use the tunable delays 454-3, 456-3 and 458-3 by applying proper values on the data select lines of the 2-channel MUXs 432-7, 432-8 and 432-9.

Similarly, the WL 206 is pulled down at t2, t3, and t4 when SMa1/SMa0 are set at 10, 01 and 00 and SMb1/SMb0 are set to 11, respectively. In the illustrated embodiment, when the WL 206 is pulled down at t4, the pulling down signal on the WL 206 starts to overlap with the pulling down signal on the BPC 210. To further increase the overlap, one can use the tunable delays 454-2, 456-2 and 458-2 by applying proper values on the data select lines of the 2-channel MUXs 432-4, 432-5 and 432-6.

Depending on the timing when the WL 206 or the WLB 207 is pulled down, asymmetry in voltage levels on the two storage nodes 350 and 360, respectively can be introduced and during the evaluation process. Similarly, the logical states on the two storage nodes are further read out through the inverters 388 and 389 to the PUF output 208 and PUF output bar 209 and further to the storage registers 120 and the comparing circuit 122 in order to identify the unstable bit cells. Different relative timings between the pulling-down signals on the WL 206, WLB 207 and the BPC 210 can be changed in a controllable fashion during the evaluation phase in order to control the voltage levels on the to two internal dynamic nodes 350/360 and are within the scope of this invention. Through multiple iterations by changing the relative timing between signals on these lines, unstable bit cells 300 in one or more selected rows in the PUF cell array 102 can be identified and a masking map containing addresses of the unstable bit cells can be generated.

Figure 6:
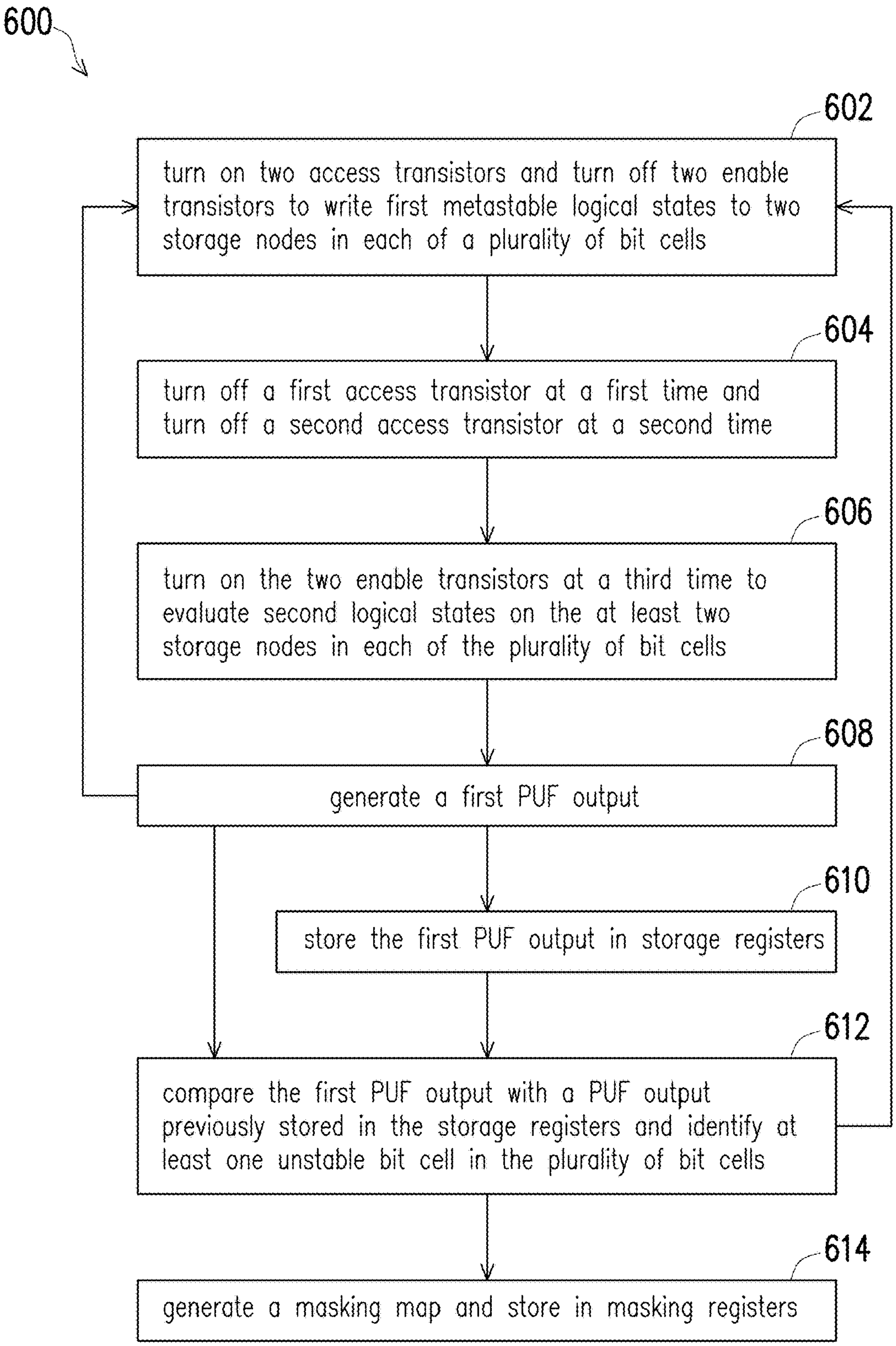
FIG. 6 illustrates a flow chart of a method to generate a masking map using a PUF cell array comprising a plurality of bit cells, in accordance with some embodiments of present disclosure.

FIG. 6 illustrates a flow chart of a method 600 to generate a masking map using a PUF cell array 102 comprising a plurality of bit cells 300, in accordance with some embodiments of present disclosure. In some embodiments, the operations of method 600 are performed by the respective components illustrated in FIGS. 1-4. For purposes of discussion, the following embodiment of the method 600 will be described in conjunction with FIGS. 1-4. The illustrated embodiment of the method 600 is merely an example for generating a masking map. Therefore, it should be understood that any of a variety of operations may be omitted, re-sequenced, and/or added while remaining within the scope of the present disclosure.

The method 600 starts with operation 602 in which two access transistors M1 310/M6 315 are turned on and two enable transistors M7 382/M8 383 are turned off to write first metastable logical states to two storage nodes SN 350 and SNB 360 in each of a plurality of bit cells 300, according to some embodiments. In some embodiments, turning off the two enable transistors M7 382/M8 383 disables the cross-coupled inverters 320/330 and turning on the access transistors M1 310/M6 315 is able to write 0's on the two storage nodes SN 350 and SNB 360 coupled to the respective two access transistors M1 310/M6 315.

The method 600 continues to operation 604 in which a first access transistors M1 310 and a second access transistor M6 315 are turned off at a first time and a second time, respectively. In some embodiments, the two access transistors are turned off at the same time under a normal operation condition (i.e., the first time equals to the second time). In some embodiments, turning off the M1 310/M6 315 are configured by pulling down the voltage on a WL 206 and a WLB 207 which are coupled to gate terminals of the access transistors M1 310/M6 315. In some embodiments, the controller 112 is configured to pull down the voltage on the WL 206 and WLB 207 separately with a controlled time delay. In some embodiments, the first time and the second time is controlled by a delay circuit 400 in the controller 112 as shown in FIG. 4. In some other embodiments, the WL 206 and WLB 207 are coupled together and thus pulled down at the same time (i.e., the first time=the second time) by a delay circuit 400 in the controller 112 without intentional delay during a normal operation condition.

The method 600 continues to operation 606 in which the two enable transistors M7 382/M8 383 are turned on at a third time to evaluate second logical states on the two storage nodes SN 350/SNB 360 in each of the plurality of bit cells 300. In some embodiments, the third time is configured by a delay circuit 400 in the controller 112, as shown in FIG. 4. In some embodiments, a normal operation condition, wherein no overlap between the pulling down of the BPC 210 and the pulling down of the WL 206/WLB 207 as shown in FIG. 6 can be configured by configuring the longest delay on the BPC 210. For example, data select lines A/B of the 4-channel MUXs 406-1, and 406-2 are configured as 00, and 11, respectively, wherein the two pulling-down signals on the WL 206 and the BPC 210 are separated by 7 delay elements. Similarly, data select lines A/B of the 4-channel MUX 406-3 in FIG. 4 can be configured as 11 to achieve the longest delay (i.e., 7 delay elements) and to prevent any overlap between the pulling down of the WLB 207 and the pulling down of the BPC 210. In some embodiments, each delay element provides a time delay on the order of pico seconds.

The method 600 continues to operation 608 in which a first PUF output is generated. In some embodiments, the first PUF output is generated with the longest delay between the pulling-downs of the WL 206/WLB 207 which are at the same time and the pulling-down of the BPC 210 under normal operational conditions (e.g., room temperature and normal $V_{DD}$).

The method 600 continues to operation 610 in which the first PUF output generated is stored in storage registers 120. In some embodiments, the storage registers 120 can be implemented with any type of on-chip memory design, including on-chip SRAMs. In some embodiments, the storage register 120 comprises on-chip memory array that contains the same number of bits as the number of bit cells in the PUF cell array 102 of the PUF generator 100. In some embodiments, the storage registers 120 comprise the same number of bits as the number of bit cells in the PUF cell array 102.

Before the method 600 continues to operation 612, operations 602-608 are repeated to generate a second PUF outputs at different first and second time for turning on the first and second transistors in each of the plurality of bit cells 300. In some embodiments, the change of the first and/or the second time for turning on the first and/or the second access transistors can introduce a signal overlap between the pulling-down signals as shown in FIG. 5, which can result in intermediate voltage levels on the two storage nodes SN 350/SNB 360, according to some embodiments. By applying different inputs to the multi-channel MUXs (i.e., 4-channel MUXs and 2-channel MUXs in FIG. 5) different levels of overlaps between the pulling down signals can be created and therefore, different intermediate voltage levels on the two storage nodes SN 350/SNB 360 can be configured. The second PUF output under a first stressed operation conditions can be then generated.

The method 600 continues to operation 612 the second PUF output generated under the first stressed operation condition is then compared with the previously stored PUF output (e.g., the first PUF output generated under a normal operation condition) to identify at least one bit cell with different logical states in the two PUF outputs. In some embodiments, each bit of the PUF output from the bit cells in at least one selected rows of the PUF cell array 102 is compared. In some embodiments, the storage registers 120 store only one PUF output. In some embodiments, a bit cell with different logical states in the two PUF outputs is identified as an unstable (hereinafter "U") bit cell. In some embodiments, an address of the unstable bit cell in the PUF cell array is then stored in a bit of masking registers 124.

Through repeated operation 602, 604, 606, 608, 610 and 612, multiple PUF outputs under stressed operation conditions by tuning the time delays using a delay circuit can be generated and compared so as to identify unstable bit cells 300 in the PUF cell array 102. In some embodiments, 6 stressed conditions can be created to determine 6 PUF outputs, by comparing which unstable bit cells 300 can be identified. To create these 6 stressed conditions, different inputs on the data select lines A/B of the 3 4-channel MUXs (i.e., 406-1, 406-2 and 406-3) are configured by the controller 112, according to some embodiments. In some embodiments, SMa=00 and SMb=11 are configured for the 4-channel MUXs 406-2 and 406-3 to obtain the second PUF output under the first stressed condition; SMa=01 and SMb=11 are configured for the 4-channel MUXs 406-2 and 406-3 to obtain a third PUF output under a second stressed condition; SMa=10 and SMb=11 are configured for the 4-channel MUXs 406-2 and 406-3 to obtain a fourth PUF output under a third stressed condition; SMa=11 and SMb=00 are configured for the 4-channel MUXs 406-2 and 406-3 to obtain a fifth PUF output under a fourth stressed condition; SMa=11 and SMb=01 are configured for the 4-channel MUXs 406-2 and 406-3 to obtain a sixth PUF output under a fifth stressed condition; and SMa=11 and SMb=10 are configured for the 4-channel MUXs 406-2 and 406-3 to obtain a seventh PUF output under a sixth stressed condition. In some embodiments, the data select lines A/B of the first 4-channel MUX 406-1 are configured as a constant value (e.g., 00). It should be noted, this is just an example is not intended to be limiting. Any testing sequences by changing the order of setting values on the data select lines A/B on the multi-channel MUXs and introducing more fine control of the overlap using the tunable delay lines as shown in FIG. 4 are within the scope of this invention.

The method 600 continues to operation 614 in which a masking map is generated. In some embodiments, the masking map comprises an address of the at least one unstable bit cell in the plurality of bit cells 300 of the PUF cell array 102.

Figure 7:
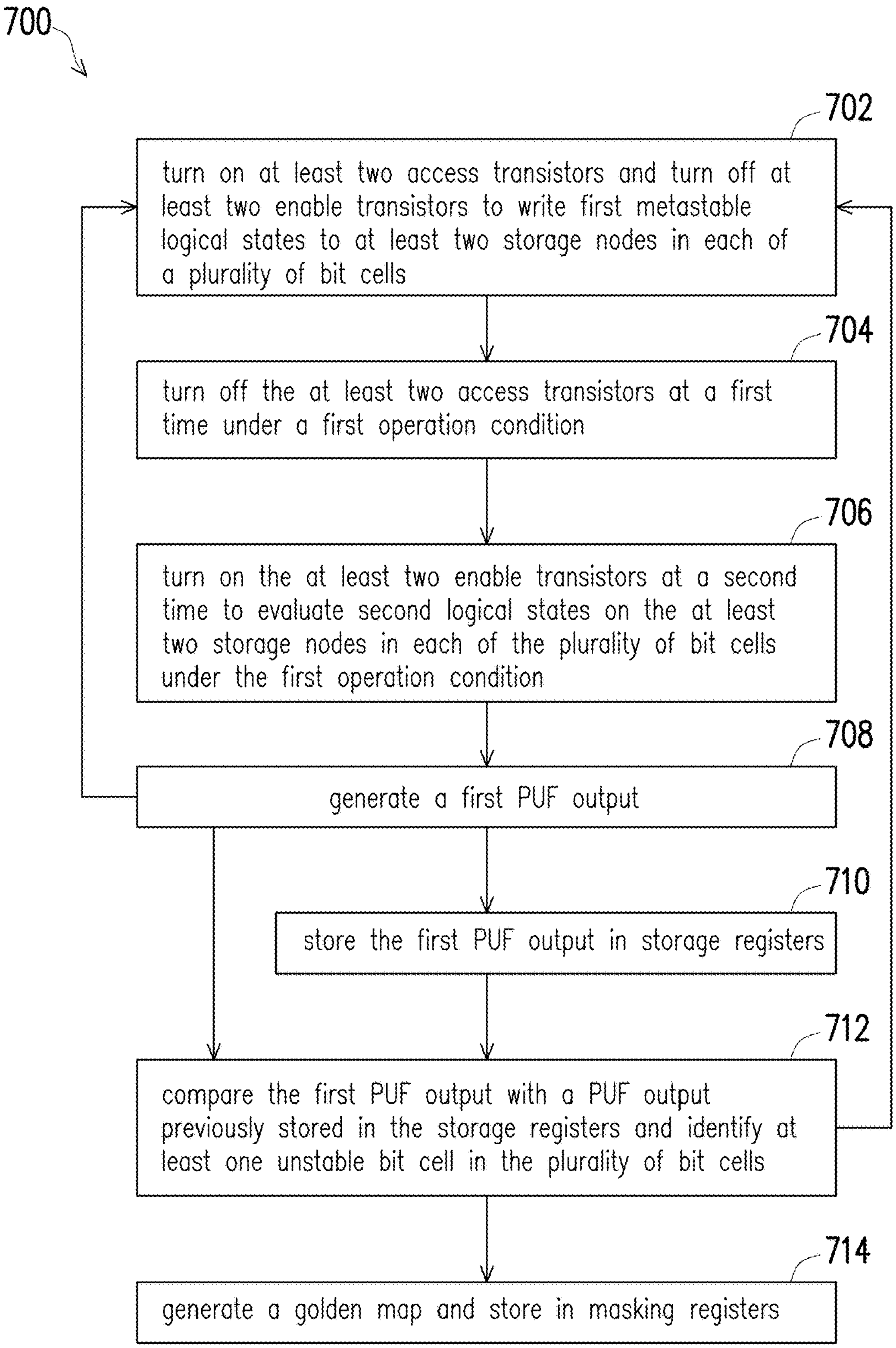
FIG. 7 illustrates a flow chart of a method to generate a golden map using a PUF cell array comprising a plurality of bit cells, in accordance with some embodiments of the present disclosure.

FIG. 7 illustrates a flow chart of a method 700 to generate a golden map using a PUF cell array 102 comprising a plurality of bit cells 300, in accordance with some embodiments of the present disclosure. In some embodiments, the operations of method 700 are performed by the respective components illustrated in FIGS. 1-4. For purposes of discussion, the following embodiment of the method 700 will be described in conjunction with FIGS. 1-4. The illustrated embodiment of the method 700 is merely an example for generating a masking map. Therefore, it should be understood that any of a variety of operations may be omitted, re-sequenced, and/or added while remaining within the scope of the present disclosure.

The method 700 starts with operation 702 in which two access transistors M1 310/M6 315 are turned on and two enable transistors M7 382/M8 383 are turned off to write first metastable logical states to two storage nodes SN 350 and SNB 360 in each of a plurality of bit cells 300, according to some embodiments. In some embodiments, turning off the two enable transistors M7 382/M8 383 disables the cross-coupled inverters 320/330 and turning on the access transistors M1 310/M6 315 is able to write 0's on the two storage nodes SN 350 and SNB 360 coupled to the respective two access transistors M1 310/M6 315.

The method 700 continues to operation 704 in which the two access transistors M1 310/M6 315 are turned off at the same time under a first operation condition, respectively. In some embodiments, the first operation condition comprises a temperature and an operational voltage (i.e., $V_{DD}$ and $V_{SS}$). In some embodiments, turning off the M1 310/M6 315 are configured by pulling down the voltage on a WL 206 and a WLB 207 which are coupled to gate terminals of the access transistors M1 310/M6 315. In some embodiments, the controller 112 is configured to pull down the voltage on the WL 206 and WLB 207 simultaneously. In some other embodiments, the WL 206 and WLB 207 are coupled together.

The method 700 continues to operation 706 in which the two enable transistors M7 382/M8 383 are turned on at a second time under the first operation condition to evaluate second logical states on the two storage nodes SN 350/SNB 360 in each of the plurality of bit cells 300. In some embodiments, the second time is configured by the controller 112 (e.g., a delay circuit 400 as shown in FIG. 4). In some embodiments, there is not overlap between the pulling down signals on the WL 206/WLB 207 and the pulling down signals on the BPC 210. For example, data select lines A/B of the 4-channel MUXs 406-1, and 406-2 are configured as 00, and 11, respectively, wherein the two pulling-down signals on the WL 206 and the BPC 210 are separated by 7 delay elements. Similarly, data select lines A/B of the 4-channel MUX 406-3 in FIG. 4 can be configured as 11 to achieve the longest delay (i.e., 7 delay elements) and to prevent any overlap between the pulling down of the WLB 207 and the pulling down of the BPC 210. In some embodiments, each delay element provides a time delay on the order of pico seconds. In some other embodiments, the size of transistors in the inverters can be tuned to provide fine-tuning of the time delay on the order of a fraction of a pico-second.

The method 700 continues to operation 708 in which a first PUF output is generated. In some embodiments, the first PUF output is generated with the longest delay between the pulling-downs of the WL 206/WLB 207 which are at the same time and the pulling-down of the BPC 210 under normal operational conditions (e.g., room temperature and normal $V_{DD}$).

The method 700 continues to operation 710 in which the first PUF output generated is stored in storage registers 120. In some embodiments, the storage registers 120 can be implemented with any type of on-chip memory design, including on-chip SRAMs. In some embodiments, the storage register 120 comprises on-chip memory array that contains the same number of bits as the number of bit cells in the PUF cell array 102 of the PUF generator 100. In some embodiments, the storage registers 120 comprise the same number of bits as the number of bit cells in the PUF cell array 102.

Before the method 700 continues to operation 712, operations 702-708 are repeated to generate a second PUF outputs at a different operation condition (i.e., a different temperature and/or a different $V_{DD}/V_{SS}$). The second PUF output under a second operation condition can be then generated.

The method 700 continues to operation 712 the second PUF output generated under the second operation condition is then compared with the previously stored PUF output (e.g., the first PUF output generated under the first operation condition) to identify at least one bit cell with different logical states in the two PUF outputs. In some embodiments, each bit of the PUF output from the bit cells in at least one selected rows of the PUF cell array 102 is compared. In some embodiments, the storage registers 120 store only one PUF output. In some embodiments, a bit cell with different logical states in the two PUF outputs is identified as an unstable (hereinafter "U") bit cell. In some embodiments, an address of the unstable bit cell in the PUF cell array is then stored in a bit of masking registers 124.

Through repeated operation 702, 704, 706, 708, 710 and 712, multiple PUF outputs under different operation conditions by operating at different temperatures (T) and/or operational voltage values (V) can be generated and compared so as to identify unstable bit cells 300 in the PUF cell array 102. In some embodiments, the different temperatures is selected in a typical temperature range of −40~125 degrees Celsius (° C.). In some embodiments, the operation voltage values are within ±10% nominal values of the normal operation condition (i.e., VDD=0.9 Volt), which is in a range of 0.81~0.99 Volt. In some embodiments, 6 stressed conditions can be created to determine 6 PUF outputs. In some embodiments, adjusting the temperature can be obtained by an external temperature control unit (not shown) comprising a heated stage, a temperature sensing element, and a control circuit, known to the one skilled in the art. To create these 6 operational conditions, 125° C./0.81 V, −40° C./0.81 V, 125° C./0.9 V, −40° C./0.9 V, 125° C./0.99 V, and −40° C./0.99 V, are configured by the controller 112 and the external temperature control unit, according to some embodiments. It should be noted, this is just an example is not intended to be limiting. Any testing sequences by changing the order of setting values or any number of tests at any other temperatures/voltage levels is within the scope of this invention.

The method 700 continues to operation 714 in which a golden map is generated. In some embodiments, the golden map comprises an address of the at least one unstable bit cell in the plurality of bit cells 300 of the PUF cell array 102.

Figure 8:
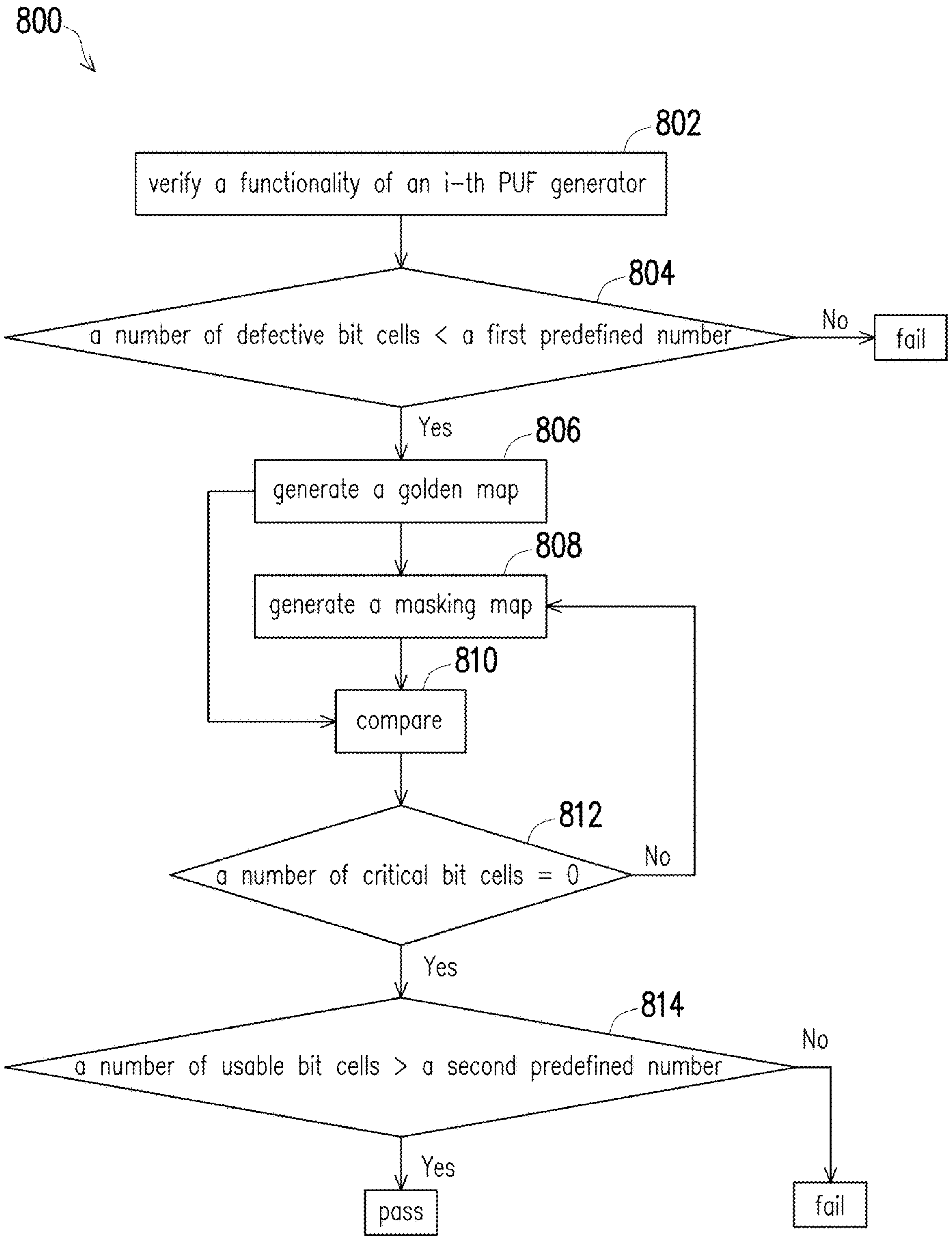
FIG. 8 illustrates a flow chart of a method for a PUF generator characterization, in accordance with some embodiments of present disclosure.

FIG. 8 illustrates a flow chart of a method 800 for a PUF generator characterization, in accordance with some embodiments of present disclosure. In some embodiments, the operations of method 800 are performed by the respective components illustrated in FIGS. 1-4, the method 600 in FIG. 6 and the method 700 in FIG. 7. For purposes of discussion, the following embodiment of the method 800 will be described in conjunction with FIGS. 1-4, 6 and 7. The illustrated embodiment of the method 800 is merely an example. Therefore, it should be understood that any of a variety of operations may be omitted, re-sequenced, and/or added while remaining within the scope of the present disclosure.

The method 800 starts with operation 802 in which functionality of an i-th PUF generator 100 is verified. In some embodiments, the functionality of the i-th PUF generator is tested by writing a predetermined logical state to and reading an output logical state from each of the plurality of bit cells in the PUF cell array 102 to determine if the PUF cell array is defective. In some embodiments, a PUF cell array 102 is determined to be defective if the number of bit cells of which the output logical states are not consistent with the predetermined logical states is greater than a predetermined threshold value. For example, referring to the bit cell 300 shown in FIG. 3 as part of a PUF generator 100 shown in FIG. 1, the functionality of the PUF generator 100 is tested by testing the functionality of each of the plurality of bit cells 300 in the PUF cell array 102. In some embodiments, the functionality of a bit cell 300 is tested by first pulling up a voltage level on the BPC 210 which turns off two enable transistors M7 382/M8 383 and two cross-coupled inverters 320/330 are disabled. Then, a voltage level on the WL 206 is then pulled up which turns on the first access transistor M1 310 and a voltage level on SN 350 is pulled down to GND, writing a logic state 0 to SN 350. Simultaneously, a voltage level on the WLB 207 is then pulled down which turns off the second access transistor M6 315. Then, the voltage level on the BPC 210 is pulled down, which turns on the two enable transistors M7 382/M8 383 and the two cross-coupled inverters 320/330 are enabled. Since SN 350 is forced to logic 0, which further forces a logic 1 on SNB 360 and a logic 0 is then read on a PUF output bar 209 after being inverted by a second output inverter 389. If the logic state read on the PUF output bar 209 is not 0, the bit cell 300 tested is determined as defective.

In some embodiments, the functionality of a bit cell 300 is further tested by pulling up a voltage level on the BPC 210 which turns off two enable transistors M7 382/M8 383 and two cross-coupled inverters 320/330 are disabled. Then, a voltage level on the WL 206 is then pulled down which turns off the first access transistor M1 310. Simultaneously, a voltage level on the WLB 207 is then pulled up which turns on the second access transistor M6 315 and a voltage level on SNB 360 is pulled down to GND, writing a logic state 0 to SNB 360. Then, the voltage level on the BPC 210 is pulled down, which turns on the two enable transistors M7 382/M8 383 and the two cross-coupled inverters 320/330 are enabled. Since SNB 350 is forced to logic 0, which further forces a logic 1 on SN 350 and a logic 1 is then read on a PUF output bar 209 after being inverted by the second output inverter 389. If the logic state read on the PUF output bar 209 is not 1, the bit cell 300 tested is determined as defective.

It should be noted that the method discussed above to test the functionality of a bit cell is just an example and is not intend to be limiting. Different methods to write a predetermined logical state and read an output logical state can be used according to the type of bit cells and are within the scope of this invention.

The method 800 continues to operation 804 in which a number of defective bit cells in a PUF cell array 102 of a PUF generator 100 is determined and compared to a predefined threshold value. In some embodiments, the plurality of bit cells in the PUF cell array 102 of a PUF generator 100 are tested by a controller 112. In some embodiments, PUT outputs from the functionality test are output directly to the BIST 130 to determine a total number of defective bit cells. In some embodiments, a margin can be added to prolong the life time of a PUF generator. For example, if a 128-bits PUF signature is required as a qualified PUF generator, at least one extra bits can be added as an aging margin. The number of bits that is required as the aging margin is predetermined and can be determined by a counter. If the number of defective bit cells that fail the functionality test is greater than the predetermined threshold, the PUF generator 100 is then discarded from further tests. In some embodiments, this predetermined threshold number of defective bit cells is zero. In other words, if one or more defective bit cells is determined in a PUF generator, the PUF generators is discarded. This is because a defective bit cell is typically a "short" in the PUF cell array, which causes increased power consumption. In some other embodiments, if the number of defective bit cells are greater than 10% of the total number of bit cells in the PUF cell array 102 of a PUF generator 100, the PUF generator 100 is discarded for further tests. This predetermined number is just an example and is not intended to be limiting. The predetermined number can be defined by application or customers, which is within the scope of this invention.

Similarly, if the number of defective bit cells that fail the functionality test is less than the predetermined threshold (i.e., the predetermined threshold>0), the PUF generator 100 is then further moved for a next quality-control test. In some embodiments, this determining process is performed by the BIST engine and addresses of defective bit cells are stored in the BIST engine. In some embodiments, the defective bit cells together with unusable bit cells in a critical masking map, which are discussed in further detail in FIG. 9 below, are used to filter PUF outputs to determine a PUF signature.

The method 800 continues to operation 806 in which a golden map is generated on PUF generators 100 that pass the functionality test. In some embodiments, the golden map is generated using the method 700 as shown in FIG. 7 using a PUF cell array 102 consisting a plurality of bit cells 300 as shown in FIG. 3. It should be noted that operations to identify unstable bit at different temperatures and operational voltage levels can be different according the type of bit cells, which are within the scope of this invention. For example, in a leakage-based DRAM bit cell, a flipped logic state caused by leakage currents is determined at different temperatures and operational voltages to determine a golden map. In some embodiments, different conditions includes different operation temperatures and voltages. In some embodiments, different temperature is controlled by a temperature control unit. In some embodiments, operational voltage is controlled by the controller 112.

The method 800 continues to operation 808 in which a masking map is generated on PUF generators 100 that pass the functionality test. In some embodiments, the masking map is generated using the method 600 as shown in FIG. 6 using a PUF cell array 102 consisting a plurality of bit cells 300 as shown in FIG. 3. It should be noted that different stressed operation conditions to identify unstable bit cells using different techniques can be used according to the type of bit cells and are within the scope of this invention. For example, in a leakage-based DRAM bit cell, one can use a noise injector, such as a ring oscillator to introduce signal oscillation to the voltage lines.

The method 800 continues to operation 810 in which the golden map obtained from operation 806 is compared with the masking map obtained in operation 808 to obtain a critical masking map. In some embodiments, an usable (U) bit cell in the critical masking map is a bit cell that are stable in both the masking map and the golden map; a non-usable (N) bit cell in the critical masking map is a bit cell that is unstable in the masking array; and a critical (C) bit cell in the critical masking map is a bit cell that is stable in the masking map but not stable in the golden map.

Figure 9:
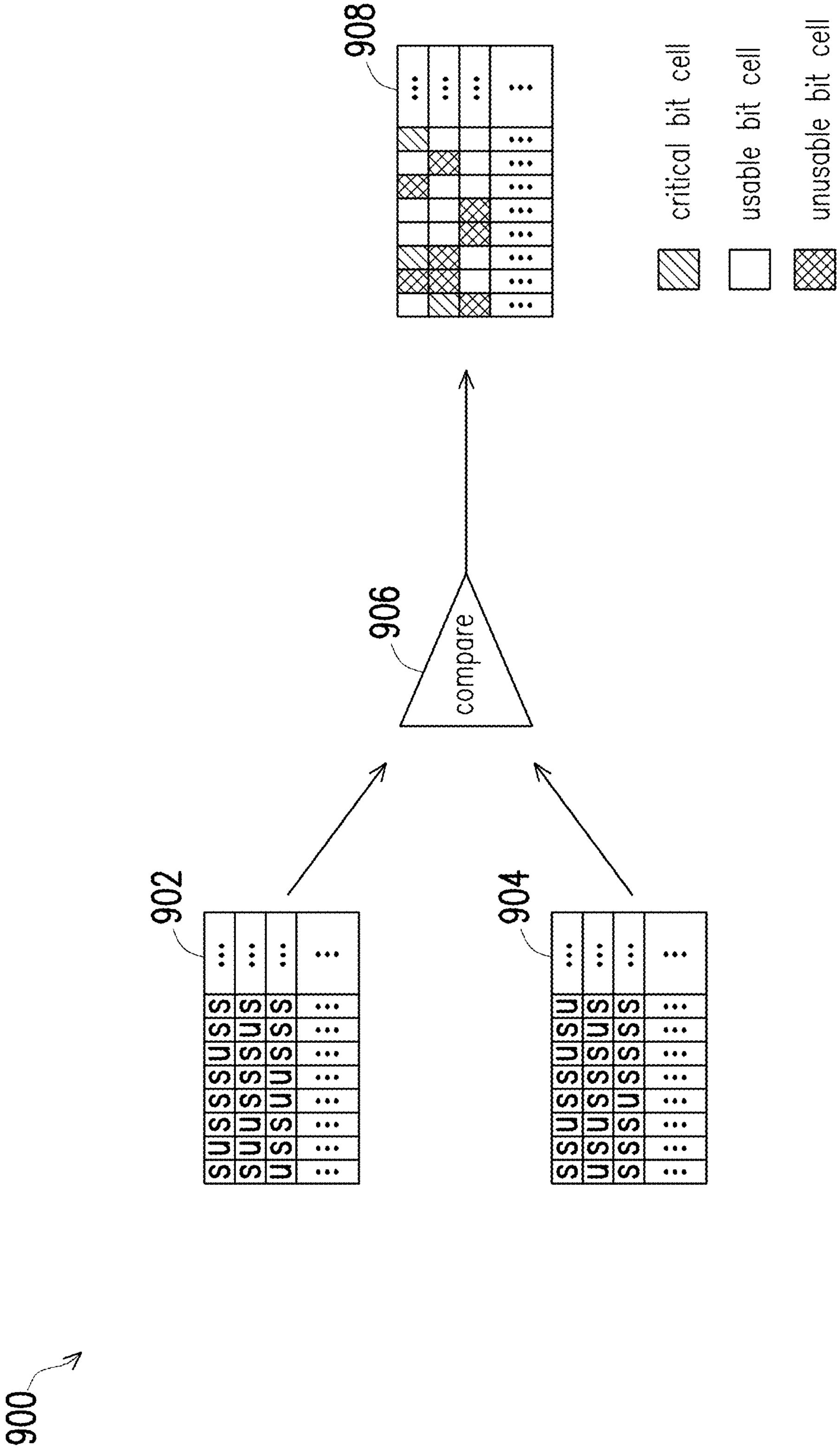
FIG. 9 illustrates an exemplary masking map and golden map comparison process to obtain a critical masking map, in accordance with some embodiments of the present disclosure.

FIG. 9 illustrates an exemplary masking map 902 and golden map 904 comparison process to obtain a critical masking map 908, in accordance with some embodiments of the present disclosure. In the illustrated embodiments, the masking map 902 comprises 24 bits and the golden map 904 comprises 24 bits. Although only 24 bits are shown, each of the masking map 902 and the golden map 904 can comprise different numbers of bits which are determined by the number of bit cells in the PUF cell array 102 and are within the scope of this invention. The masking map 902 comprises 8 unstable bit cells and 16 stable bit cells, and the golden map 904 comprises 7 unstable bit cells and 17 stable bit cells. After being compared in a comparing circuit 906, the critical masking map 908 comprising 24 bits can be obtained. In the illustrated embodiments, there are 13 usable bit cells, 8 unusable bit cells and 3 critical bit cells.

The method 800 continues to operation 812 in which the number critical bit cells from the operation 810 is determined and compared to zero. If the number of critical bit cells in the critical masking map is determined to be not zero (e.g., 3 critical bit cells in the critical masking map 908), the method 800 continues with operation 808 by obtaining a second masking map at different stressed operation conditions. Then, the method 800 continues with operation 810 and 812 to compare the second masking map with the golden map in order to further determine the number of critical bit cells in a second critical masking map. This process continues until the number of critical bit cells in the critical masking map is determined to be zero. In some embodiments, when the number of critical cells is not able to be reduced to zero after a predefined time of testing or a certain numbers of iterations of different testing conditions, and further there is not enough usable cells (i.e., the number of useable cells is less than a desirable signature bits number), then the PUF generator under test is marked as FAILED. In some embodiments, the amount of time used to test or the number of iterations for testing is determined by a predetermined cost factor in order to balance the yield and cost.

The method 800 continues to operation 814 in which a number of usable bit cells are determined and compared to a predefined threshold value. In some embodiments, if the number of usable bit cells in the critical masking map that does not contain any critical bit cell is greater than the predefined threshold value, the PUF generator 100 passes the quality-control tests and is determined as a qualified PUF generator. Similarly, if the number of usable bit cells in the critical masking map that does not contain any critical bit cell is less than the predefined threshold value, the PUF generator 100 fails the aforementioned quality-control tests and is determined as an unqualified PUF generator. In some embodiments, a percentage (P) of a total number of bit cells that have logic 0 or 1 in the total number of usable bit cells in the critical masking map is also determined. In some other embodiments, a qualified PUF generator also provides a P value in a range of 45-55%.

Figure 10:
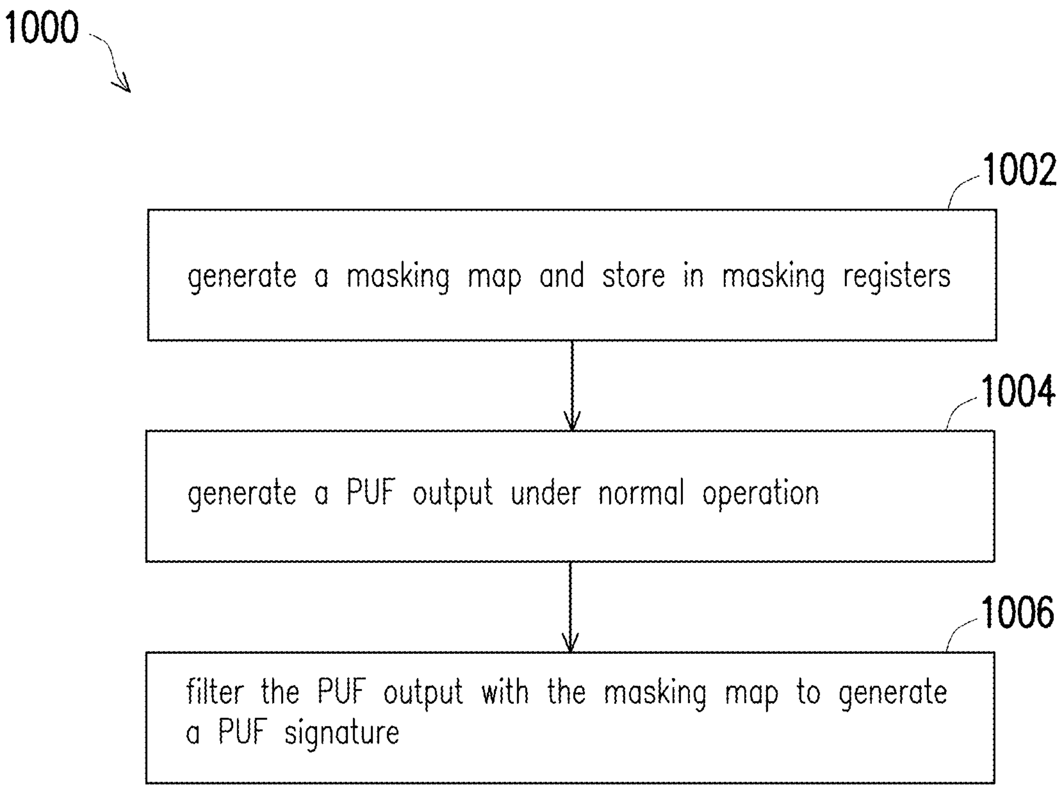
FIG. 10 illustrates a flow chart of a method to generate a PUF signature using a qualified PUF generator that passes the quality control tests, in accordance with some embodiments of present disclosure.

FIG. 10 illustrates a flow chart of a method 1000 to generate a PUF signature using a qualified PUF generator that passes the quality control tests, in accordance with some embodiments of present disclosure. In some embodiments, the operations of method 1000 are performed by the respective components illustrated in FIGS. 1-4, the methods 600, 700 and 800 illustrated in FIGS. 6-8. For purposes of discussion, the following embodiment of the method 800 will be described in conjunction with FIGS. 1-4 and 6-8. The illustrated embodiment of the method 1000 is merely an example. Therefore, it should be understood that any of a variety of operations may be omitted, re-sequenced, and/or added while remaining within the scope of the present disclosure.

The method 1000 starts with operation 1002 in which a critical masking map is generated. In some embodiments, the critical masking map is generated using methods 600, 700 and 800 described above. In some embodiments, the critical masking map comprises no critical bit cells and a percentage of usable bit cells with logic 1 or 0 in the total number of usable bit cells of the critical masking map equals to 45-55%.

The method 1000 continues to operation 1004 in which a PUF output under normal operation conditions is generated. In some embodiments, the PUF output is generated using operations described in the method 600. It should be noted that different methods to generate a PUF output under normal operation conditions can be used depending on the types of bit cells and are within the scope of this invention.

The method 1000 continues to operation 1006 in which a PUF output obtained under normal operation conditions is filtered by the critical masking map to generate a PUF signature. In some embodiments, bit cells that are marked with "1" is used to identify unstable bit cells.

Figure 11:
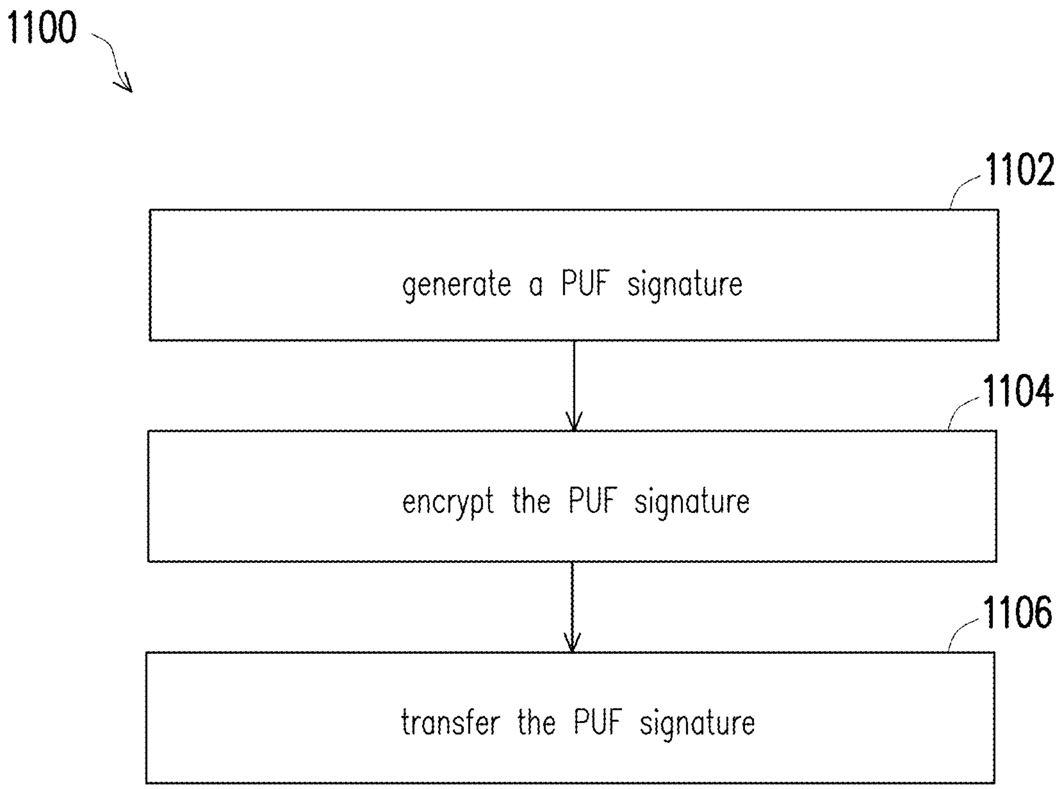
FIG. 11 illustrates a flow chart of a method to transfer a PUF signature to a server from a qualified PUF generator that passes a quality control tests, in accordance with some embodiments of present disclosure.

FIG. 11 illustrates a flow chart of a method 1100 to securely transfer a PUF signature to a server from a qualified PUF generator that passes a quality control tests, in accordance with some embodiments of present disclosure. In some embodiments, the operations of method 1100 are performed by the respective components illustrated in FIGS. 1-4, the methods 600-1000 illustrated in FIGS. 6-10. For purposes of discussion, the following embodiment of the method 800 will be described in conjunction with FIGS. 1-4 and 6-10. The illustrated embodiment of the method 1100 is merely an example. Therefore, it should be understood that any of a variety of operations may be omitted, re-sequenced, and/or added while remaining within the scope of the present disclosure.

The method 1100 starts with operation 1102 in which a PUF signature is generated. In some embodiments, the PUF signature is generated using the method 1000 shown in FIG. 10 in combination with methods 600-800 shown in FIGS. 6-8.

The method 1100 continues with operation 1104 in which the PUF signature encrypted. In some embodiments, the PUF signature is transferred to a lock box 132 which also receives a public key for encryption of the PUF signature. In some embodiments, the lock box 132 comprises an asymmetric encrypter. In some embodiments, the lock box 132 contains one of the following asymmetric key encryption algorithm, such as for example RSA (Rivest-Shamir-Adleman), DSA (Digital Signature Algorithm), ECC (Elliptic Curve Cryptography), ElGamal algorithms, etc. In some embodiments, the lock box 132 comprises a processor and a control logical circuit (both are not shown in FIG. 1) in order to encrypt the PUF signature to be transmitted to a server in response to a request received from the server at the controller 112.

The method 1100 continues to operation 1106 in which the encrypted PUF signature is transferred to the server through a dedicated I/O port 136 for external uses. In some embodiments, the encrypted PUF signature may also comprises helper data which is used to recover noisy PUF information. In some embodiments, the server also receives and decrypts the encrypted PUF signature using an asymmetric encrypter which contains a private key. In some embodiments, only authorized servers with matching private key can perform the decryption and obtain the PUF signature.

In one embodiment, a testing method for physical unclonable function (PUF) generator includes: verifying a functionality of a PUF generator by writing preconfigured logical states to and reading output logical states from a plurality of bit cells in a PUF cell array; determining a first number of first bit cells in the PUF cell array, wherein the output logical states of the first bit cells are different from the preconfigured logical states; if the first number of first bit cells is less than a first predetermined number, generating a first map under a first set of operation conditions using the PUF generator and a masking circuit, wherein the first map comprises at least one stable bit cells and at least one unstable bit cell; generating a second map under a second set of operation conditions using the PUF generator and the masking circuit, wherein the second map comprises at least one stable bit cells and at least one unstable bit cell; determining a second number of second bit cells, wherein the second bit cells are stable in the first map and unstable in the second map using a Built-in Self Test (BIST) engine; if the second number of second bit cells is determined to be zero, determining a third number of third bit cells using the BIST engine, wherein the third bit cells are stable in the first map and stable in the second map; and if the third number of third bit cells are greater than a second preconfigured number, the PUF generator is determined as a qualified PUF generator.

In another embodiment, a physical unclonable function (PUF) generator includes: a PUF cell array comprising a plurality of bit cells, wherein the plurality of bit cells each provides a logical state; a controller coupled to the PUF cell array, wherein the controller is configured to provide a first set and a second set of operation conditions to the PUF cell array; a masking circuit configured to determine a first map and a second map, wherein the first and second maps determined under the first and second set of operation conditions, respectively, each comprises a plurality of logical states of the plurality of bit cells in the PUF cell array, wherein the first and second maps each comprises at least one stable bit cells and at least one unstable bit cell; and a Built-In Self Test (BIST) engine, configured to determine a first number of first bit cells and a second number of second bit cells, wherein the first bit cells are stable in the first map and unstable in the second map, wherein the second bit cells are stable in the first map and stable in the second map.

Yet, in another embodiment, a physical unclonable function (PUF) generator includes: a PUF cell array comprising a plurality of bit cells, wherein the plurality of bit cells each comprises two cross-coupled inverters; at least two access transistors, at least one enable transistor, and at least two storage nodes, wherein the at least two storage nodes are pre-configured with substantially the same voltages allowing each of the plurality of bit cells having a first metastable logical state; a controller coupled to the PUF cell array, wherein the controller comprising a delay circuit is configured to provide a first set and a second set of operation conditions to the PUF cell array; a masking circuit configured to determine a first map and a second map, wherein the first and second maps determined under the first and second set of operation conditions, respectively, each comprises a plurality of logical states of the plurality of bit cells in the PUF cell array, wherein the first and second maps each comprises at least one stable bit cells and at least one unstable bit cell; and a Built-In Self Test (BIST) engine, configured to determine a first number of first bit cells and a second number of second bit cells, wherein the first bit cells are stable in the first map and unstable in the second map, wherein the second bit cells are stable in the first map and stable in the second map.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of evaluating a physical unclonable function (PUF) generator, the method comprising:

generating a first physical unclonable function (PUF) output from a plurality of bit cells in a PUF cell array under a first set of operation conditions;

storing the first PUF output in a memory;

comparing the first PUF output stored in the memory with a PUF output previously stored in the memory to identify at least one unstable first bit cell in the plurality of bit cells;

generating a first masking map that comprises an address of the at least one unstable first bit cell;

generating a second PUF output from the plurality of bit cells in the PUF cell array under a second set of operation conditions different than the first set of operation conditions;

storing the second PUF output in the memory;

comparing the second PUF output with the PUF output previously stored in the memory to identify at least one unstable second bit cell in the plurality of bit cells;

generating a second masking map that comprises an address of the at least one unstable second bit cell; and comparing the first masking map to the second masking map to generate a third map that identifies a first set bit sells that are stable in both the first and second operation conditions, a second set of bit sells that are stable in the first operation condition but unstable in the second operation condition, and a third set of bit sells that are unstable in the first operation condition but stable in the second operation condition.

2. The method of claim 1, wherein the first set of operation conditions comprises injecting noise into signal lines of the PUF cell array, wherein the noise is configured by a controller.

3. The method of claim 2, wherein the controller comprises a delay circuit configured to tune relative timing between signals to provide the noise.

4. The method of claim 1, wherein the second set of operation conditions comprises different temperatures and operational voltage levels configured by the controller.

5. The method of claim 1, further comprising if the second set of bit cells is determined to be not zero, re-generating the second masking map under a third set of operation conditions until the second set of bit cells is determined to be zero.

6. The method of claim 1, further comprising, when a number of the first set of bit cells is less than a predetermined number, determining the PUF generator is an unqualified PUF generator.

7. The method of claim 1, wherein the PUF generator further comprises:

a Built-In Self Test (BIST) engine configured to compare the first and second masking map; and a lock box configured to encrypt a PUF signature generated by the PUF generator before transmitting to a server.

8. A physical unclonable function (PUF) generator comprising:

a PUF cell array comprising a plurality of bit cells, wherein the plurality of bit cells each provides a logical state;

a controller coupled to the PUF cell array, wherein the controller is configured to provide at least one first operation condition and at least one second operation condition to the PUF cell array, wherein the at least one first operation condition is different from the at least one second operation condition;

a masking circuit configured to determine a first map and a second map based on the first and second set of operation conditions, respectively, wherein each of the first and second maps comprises at least one stable bit cell and at least one unstable bit cell; and a compare circuit configured to determine a first number of first bit cells, a second number of second bit cells, and a third number of third bit cells, wherein the first bit cells are stable in the first map and unstable in the second map, wherein the second bit cells are unstable in the first map and stable in the second map, wherein the third bit cells are stable in the first map and stable in the second map, wherein the PUF generator is determined as a qualified PUF generator that meets a predefined quality criterion based at least on the third number being greater than a predetermined threshold.

9. The PUF generator of claim 8, wherein the at least one first operation condition comprises at least one stressed operation condition and the at least one second operation condition comprises at least one of a different temperature and a different operational voltage level compared to the at least one first operation condition.

10. The PUF generator of claim 8, wherein the masking circuit further comprises:

storage registers configured to store a first PUF output from the PUF cell array;

a comparing circuit configured to compare a second PUF output with the first PUF output in the storage registers to identify the at least one unstable bit cell in the first and second maps, wherein logical states of the unstable bit cell in the first and the second PUF outputs are different;

masking registers configured to store an address of the at least one unstable bit cell;

a masking circuit configured to exclude the logical state of the at least one unstable bit cell to generate a PUF signature; and shifted registers configured to select the second bit cells to generate the PUF signature.

11. The PUF generator of claim 8, wherein the controller is further configured to write preconfigured logical states to the plurality of bit cells in a PUF cell array; and read output logical states from the plurality of bit cells in a PUF cell array.

12. The PUF generator of claim 11, wherein the controller is further configured to, when the first number of first bit cells is determined to be greater than zero, re-generate the second map under a third set of operation conditions until the first number of first bit cells is determined to be zero; and determine a qualification of a PUF generator based on a comparison of the third number of the third bit cells and a predetermined number.

13. The PUF generator of claim 8, further comprising:

a lock box configured to encrypt the PUF signature before transmitting to a server.

14. A physical unclonable function (PUF) generator comprising:

a PUF cell array comprising a plurality of bit cells;

a controller coupled to the PUF cell array, wherein the controller comprising a delay circuit is configured to provide a first and a second operation condition to the PUF cell array, wherein the first operation condition is different from the second operation condition;

a masking circuit configured to generate a first masking map that comprises an address of at least one unstable bit under a first set of operation conditions, and generate a second masking map that comprises the address of at least one unstable bit under a second set of operation conditions different than the first set of operation conditions;

a compare circuit configured to compare the first masking map and the second masking map to generate a third masking map that identifies a first number of first bit cells, a second number of second bit cells and a third number of third bit cells, wherein the first bit cells are stable in the first masking map and unstable in the second masking map, wherein the second bit cells are unstable in the first masking map and stable in the second map, wherein the third bit cells are stable in both the first and second masking masks; and an engine that determines, when the second number of second bit cells is zero and the third number of third bit cells is greater than a predetermined threshold, the PUF generator is determined as a qualified PUF generator that meets a predefined quality criterion.

15. The PUF generator of claim 14, wherein:

each of the plurality of bit cells comprises at least two access transistors, at least one enable transistor, and at least two storage nodes; and the at least two access transistors are coupled between the delay circuit and the at least two storage nodes.

16. The PUF generator of claim 15, wherein:

each of the at least two access transistors comprises an NMOS transistor; and the at least one enable transistor comprises a PMOS transistor.

17. The PUF generator of claim 14, wherein the masking circuit further comprises:

storage registers configured to store a first PUF output from the PUF cell array;

a comparing circuit configured to compare a second PUF output with the first PUF output in the storage registers to identify the at least one unstable bit cell in the first and second maps, wherein logical states of the unstable bit cell in the first and the second PUF outputs are different;

masking registers configured to store an address of the at least one unstable bit cell;

a masking to exclude the logical state of the at least one unstable bit cell to generate a PUF signature; and shifted registers configured to select the second bit cells to generate the PUF signature.

18. The PUF generator of claim 14, wherein the controller is further configured to:

write preconfigured logical states to the plurality of bit cells in a PUF cell array, read output logical states from the plurality of bit cells in a PUF cell array.

19. The PUF generator of claim 14, wherein the first operation condition comprises a stressed operation condition and the second operation condition comprises at least one of a different temperature and a different operational voltage level compared to the first operation condition.

20. The PUF generator of claim 14, further comprising:

a lock box configured to encrypt the PUF signature before transmitting to a server.

* * * * *